US010754103B2

(12) United States Patent
Leigh et al.

(10) Patent No.: US 10,754,103 B2
(45) Date of Patent: Aug. 25, 2020

(54) UNIVERSAL-BLINDMATE SLEEVE AND BLINDMATE CONNECTORS

(71) Applicant: Hewlett Packard Enterprise Development LP, Houston, TX (US)

(72) Inventors: Kevin B. Leigh, Houston, TX (US); John Norton, Houston, TX (US); Joseph Allen, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/154,645

(22) Filed: Oct. 8, 2018

(65) Prior Publication Data
US 2020/0110226 A1   Apr. 9, 2020

(51) Int. Cl.
*G02B 6/38* (2006.01)
*H01R 13/453* (2006.01)
*H01R 13/52* (2006.01)

(52) U.S. Cl.
CPC ......... *G02B 6/3874* (2013.01); *G02B 6/3825* (2013.01); *G02B 6/3849* (2013.01); *H01R 13/4538* (2013.01); *H01R 13/5213* (2013.01); *H01R 13/4536* (2013.01)

(58) Field of Classification Search
CPC .. G02B 6/3874; G02B 6/3849; G02B 6/3825; H01R 13/5213; H01R 13/4538; H01R 13/45367
See application file for complete search history.

(56) References Cited

U.S. PATENT DOCUMENTS

| | | | | | |
|---|---|---|---|---|---|
| 3,847,287 | A | * | 11/1974 | Dinse | B23K 9/133 219/136 |
| 5,362,261 | A | * | 11/1994 | Puerner | H01R 13/4364 439/689 |
| 5,931,688 | A | * | 8/1999 | Hasz | H01R 13/748 439/247 |
| 6,984,073 | B2 | * | 1/2006 | Cox | G02B 6/3897 385/55 |

(Continued)

FOREIGN PATENT DOCUMENTS

EP   2875553   5/2018

OTHER PUBLICATIONS

LC Adapter with Inner Shutter, Senko Advanced Components, Inc., Sep. 1, 2016, <http://www.senko.com/literature/Handohut%20LC%20Adapter%20Inner-Shutter%202.pdf.

*Primary Examiner* — Ellen E Kim
(74) *Attorney, Agent, or Firm* — Nolte Intellectual Property Law Group

(57) ABSTRACT

Systems and methods are provided for universal-blindmate sleeve comprising mounting mechanisms for mounting the universal sleeve to a midplane. The universal-blindmate sleeve comprising a sleeve housing, having a first opening for receiving a first blindmate connector. The first opening is arranged at an end of the sleeve housing and facing a first side of the midplane. The sleeve housing further having a second opening for receiving a second blindmate connector, wherein the second opening is arranged at an opposing end of the sleeve housing and facing an opposing side of the midplane. A body of the sleeve housing is configured for blindmating the first blindmate connector to the second blindmate connector through the midplane.

15 Claims, 13 Drawing Sheets

(56) References Cited

U.S. PATENT DOCUMENTS

| | | | | |
|---|---|---|---|---|
| 7,278,879 B2* | 10/2007 | Kim | ............... | H01R 13/518 |
| | | | | 439/540.1 |
| 7,867,040 B2* | 1/2011 | Yu | ............... | H01R 13/518 |
| | | | | 439/701 |
| 8,814,605 B2* | 8/2014 | Yu | ............... | H01R 13/055 |
| | | | | 439/689 |
| 8,936,400 B2 | 1/2015 | Jibiki | | |
| 8,968,014 B2 | 3/2015 | Russell | | |
| 9,176,284 B2 | 11/2015 | Megason | | |
| 9,210,048 B1* | 12/2015 | Marr | ............... | H04L 41/145 |
| 9,494,746 B2* | 11/2016 | Sanders | ............... | G02B 6/3825 |
| 9,581,767 B2 | 2/2017 | Leigh et al. | | |
| 9,798,092 B2 | 10/2017 | Leigh et al. | | |
| 9,874,702 B2 | 1/2018 | Megason | | |
| 9,910,228 B2 | 3/2018 | Leigh et al. | | |
| 10,012,799 B2* | 7/2018 | Sanders | ............... | G02B 6/3825 |
| 2002/0114589 A1* | 8/2002 | Igl | ............... | G02B 6/3803 |
| | | | | 385/88 |
| 2003/0073055 A1* | 4/2003 | Pollock | ............... | A61C 1/18 |
| | | | | 433/126 |
| 2008/0085620 A1* | 4/2008 | Wood | ............... | H01R 13/005 |
| | | | | 439/178 |
| 2010/0046891 A1* | 2/2010 | Sabo | ............... | G02B 6/3817 |
| | | | | 385/74 |
| 2010/0304587 A1 | 12/2010 | Fukushi | | |
| 2018/0277986 A1* | 9/2018 | Eckel | ............... | H01R 9/16 |

* cited by examiner

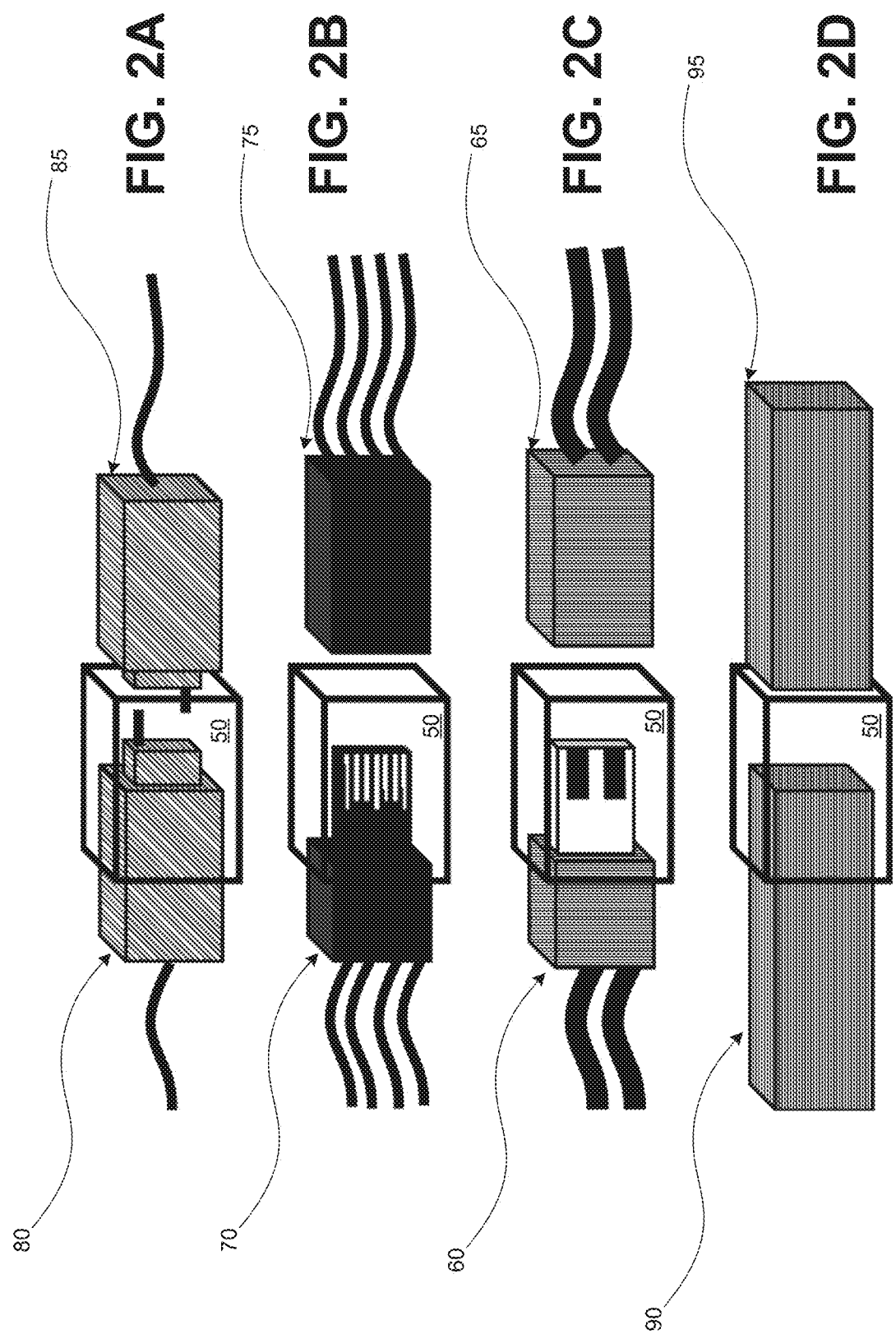

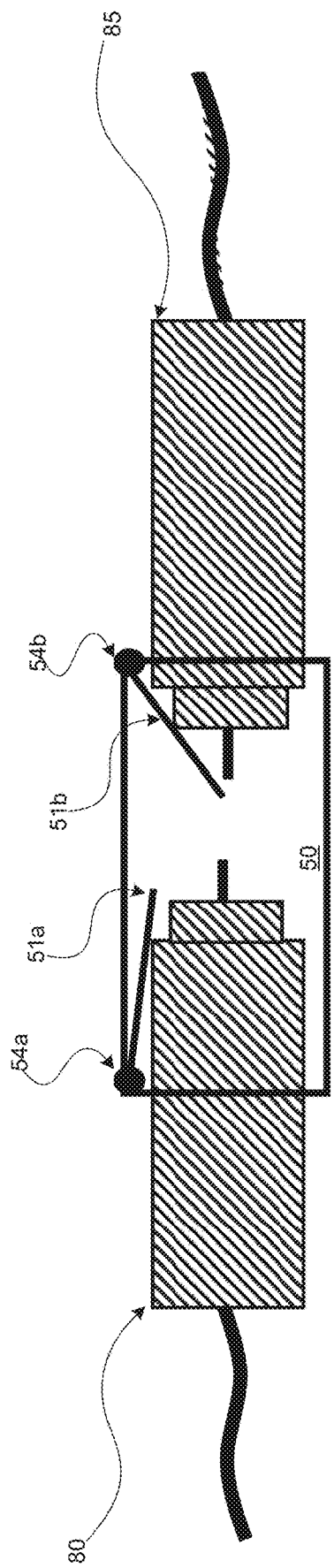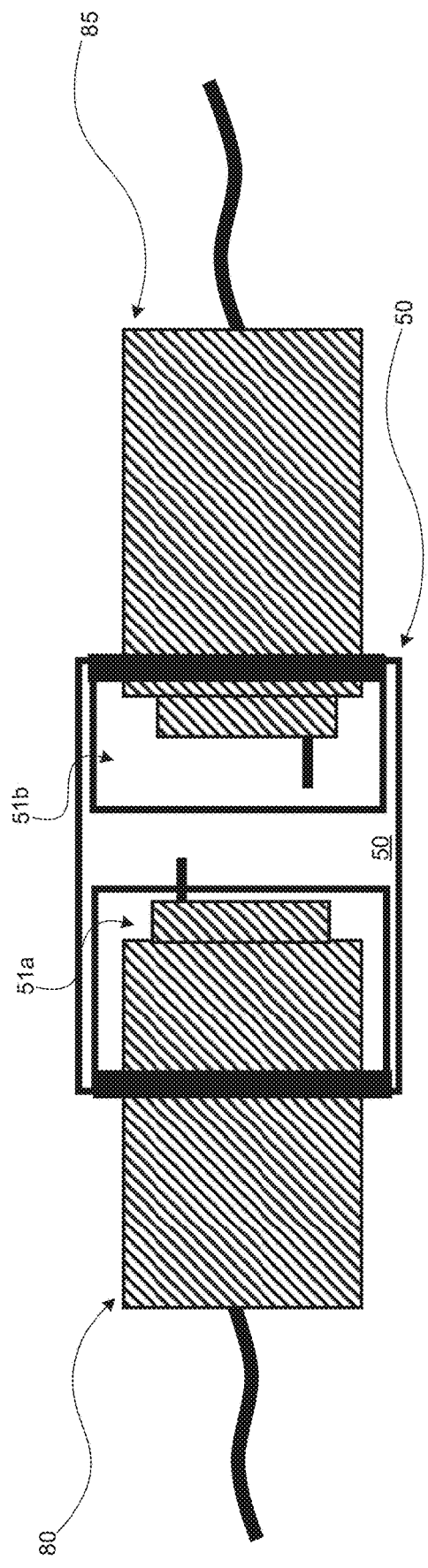
FIG. 3A
FIG. 3B

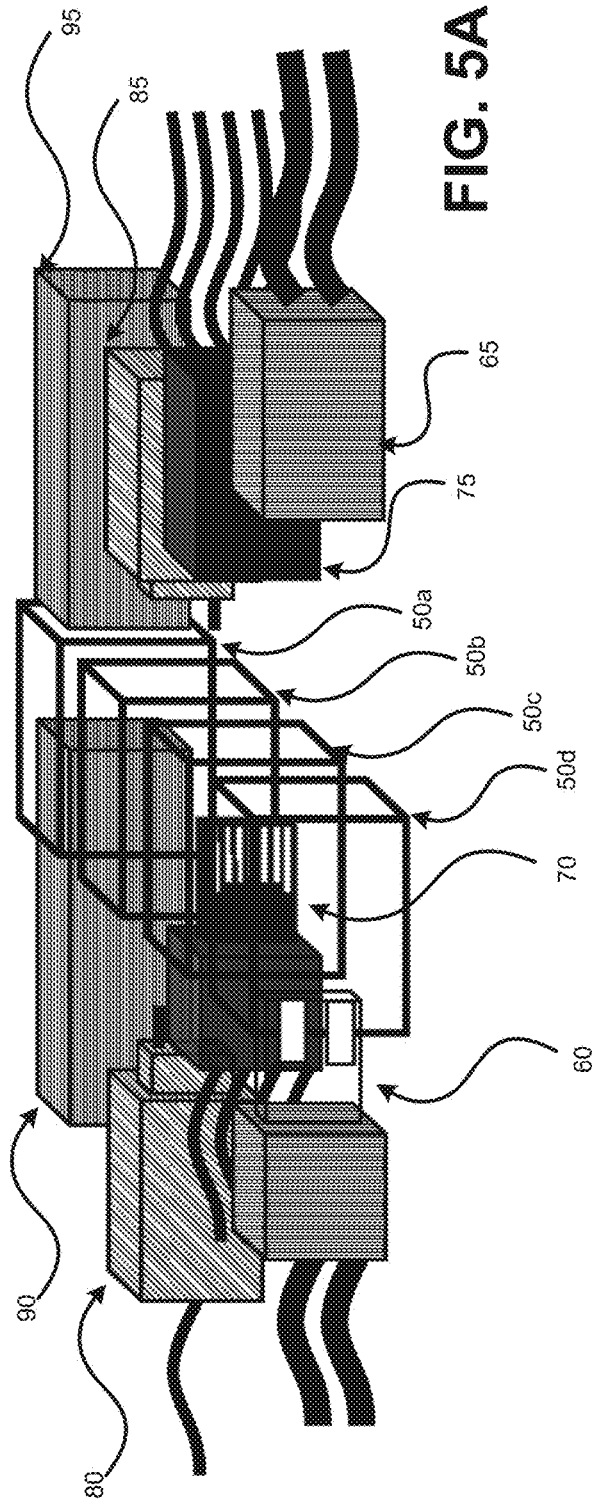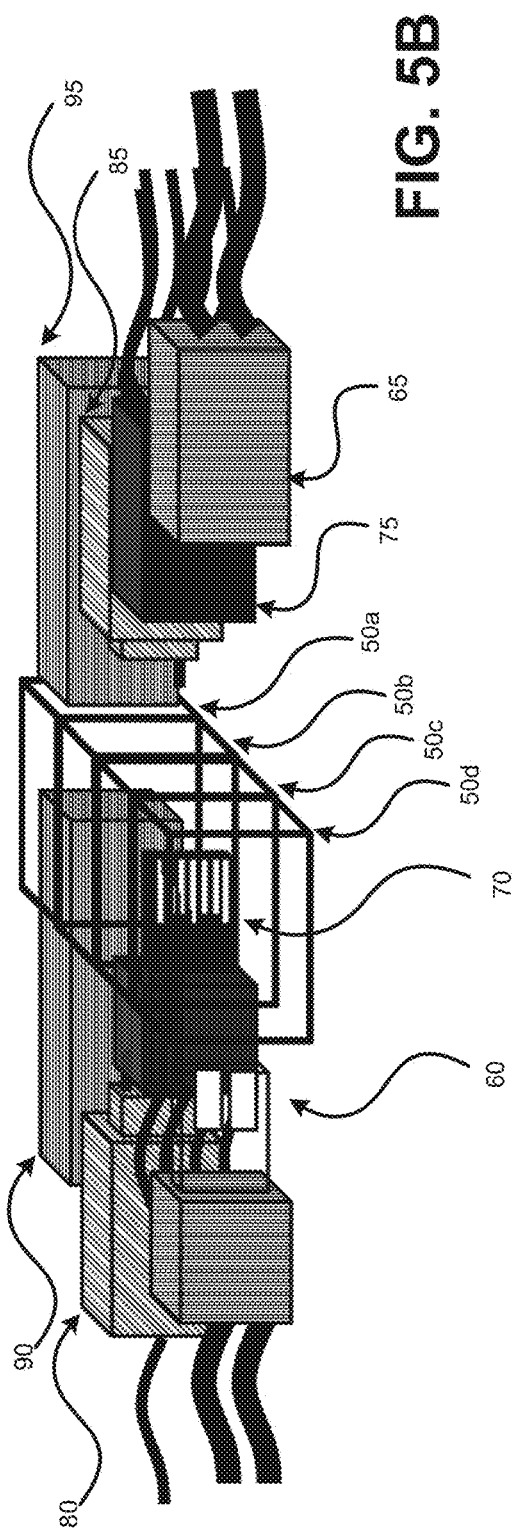

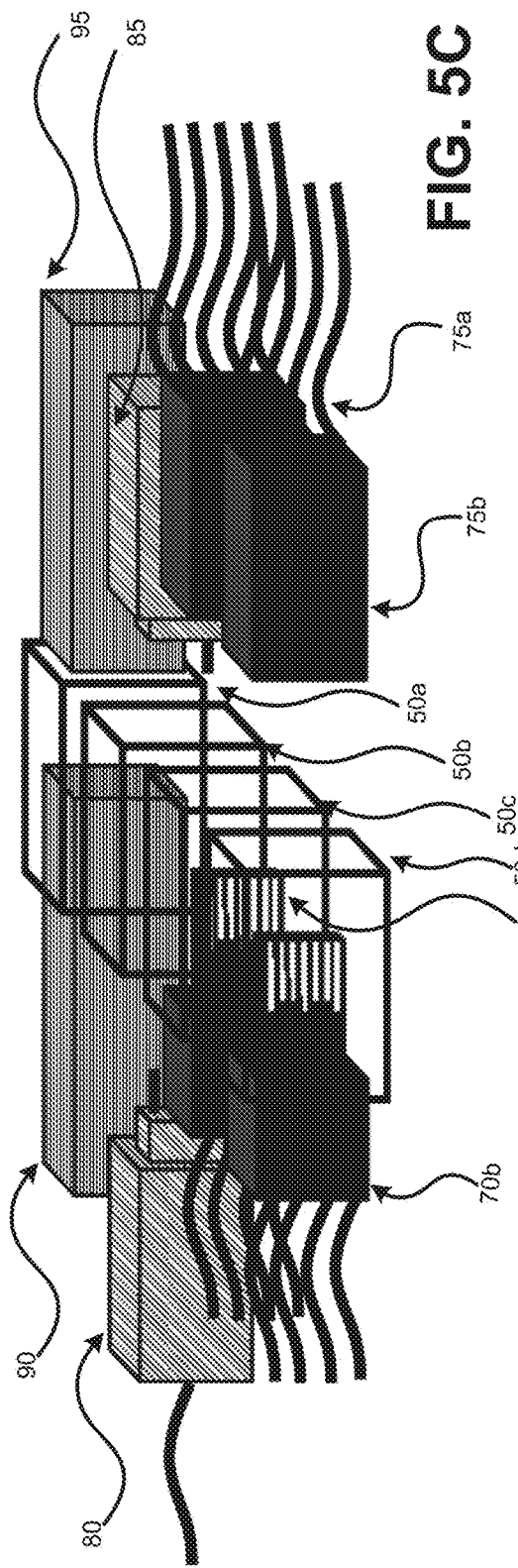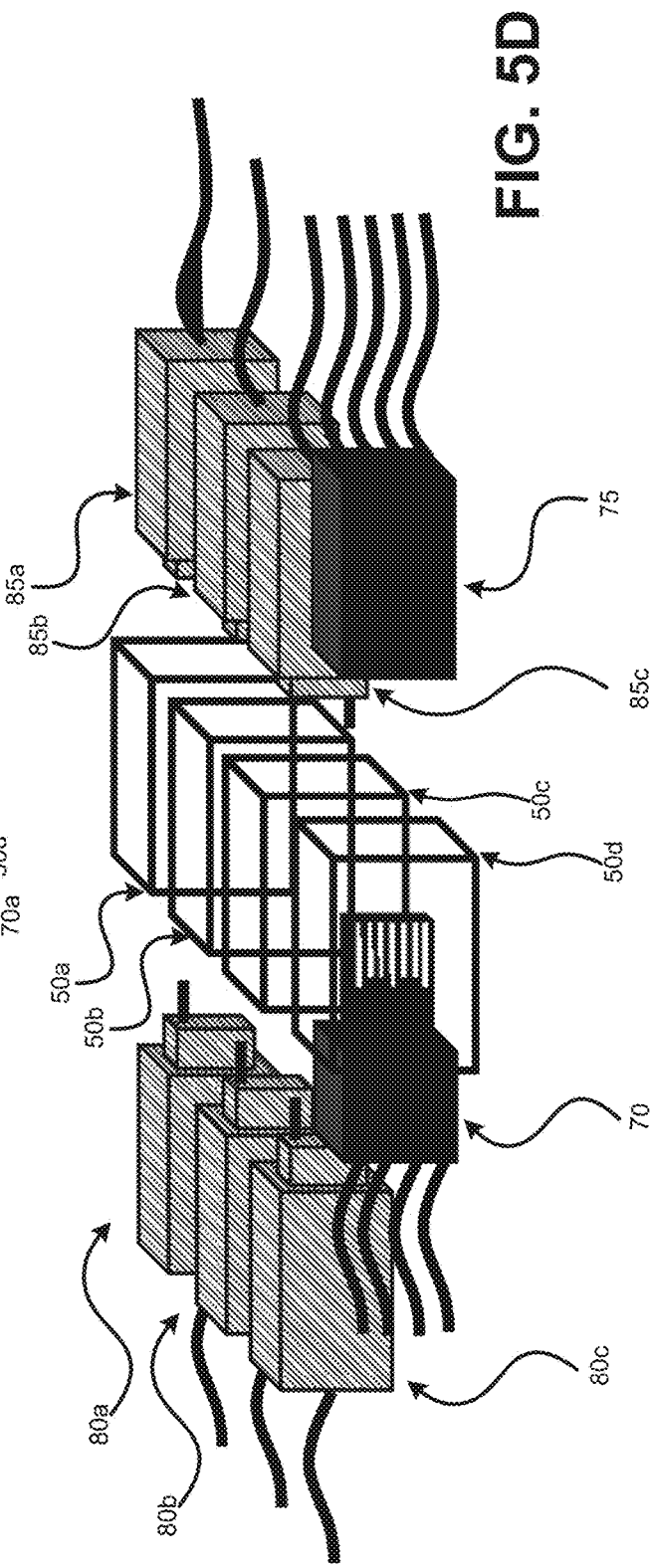

and blindmate connectors shown in FIG. 1, according to some embodiments.
UNIVERSAL-BLINDMATE SLEEVE AND BLINDMATE CONNECTORS

DESCRIPTION OF RELATED ART

Optical communications are increasingly used in systems to achieve data communication with a greater bandwidth and/or lower electromagnetic interference as compared to electrical communications. In some systems, optical and electrical communication interconnections may be used. Optical fibers may be employed for optical input/output, and for some applications, optical fibers may be coupled to other optical fibers and/or system components by an optical connector.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 2A is an example of a universal-blindmate sleeve accepting an optical blindmate connector configured as a receptacle and an optical blindmate connector configured as a plug shown in FIG. 1, according to some embodiments.

FIG. 2B is an example of a universal-blindmate sleeve accepting an electrical signal blindmate connector configured as a receptacle and an electrical signal blindmate connector configured as a plug for blindmating shown in FIG. 1, according to some embodiments.

FIG. 2C is an example of a universal-blindmate sleeve accepting an electrical power blindmate connector configured as a receptacle and an electrical power blindmate connector configured as a plug for blindmating shown in FIG. 1, according to some embodiments.

FIG. 2D is an example of a universal-blindmate sleeve accepting a cooling conduit blindmate connector configured as a receptacle and a cooling conduit blindmate connector configured as a plug for blindmating shown in FIG. 1, according to some embodiments.

FIGS. 3A-3B are views of an example universal-sleeve including shutters, according to some embodiments.

FIGS. 5A-5D are examples of multiple universal-blindmate sleeves arranged in various configurations and employed for blindmating multiple blindmate connectors of varying types, according to some embodiments.

Figure 1:
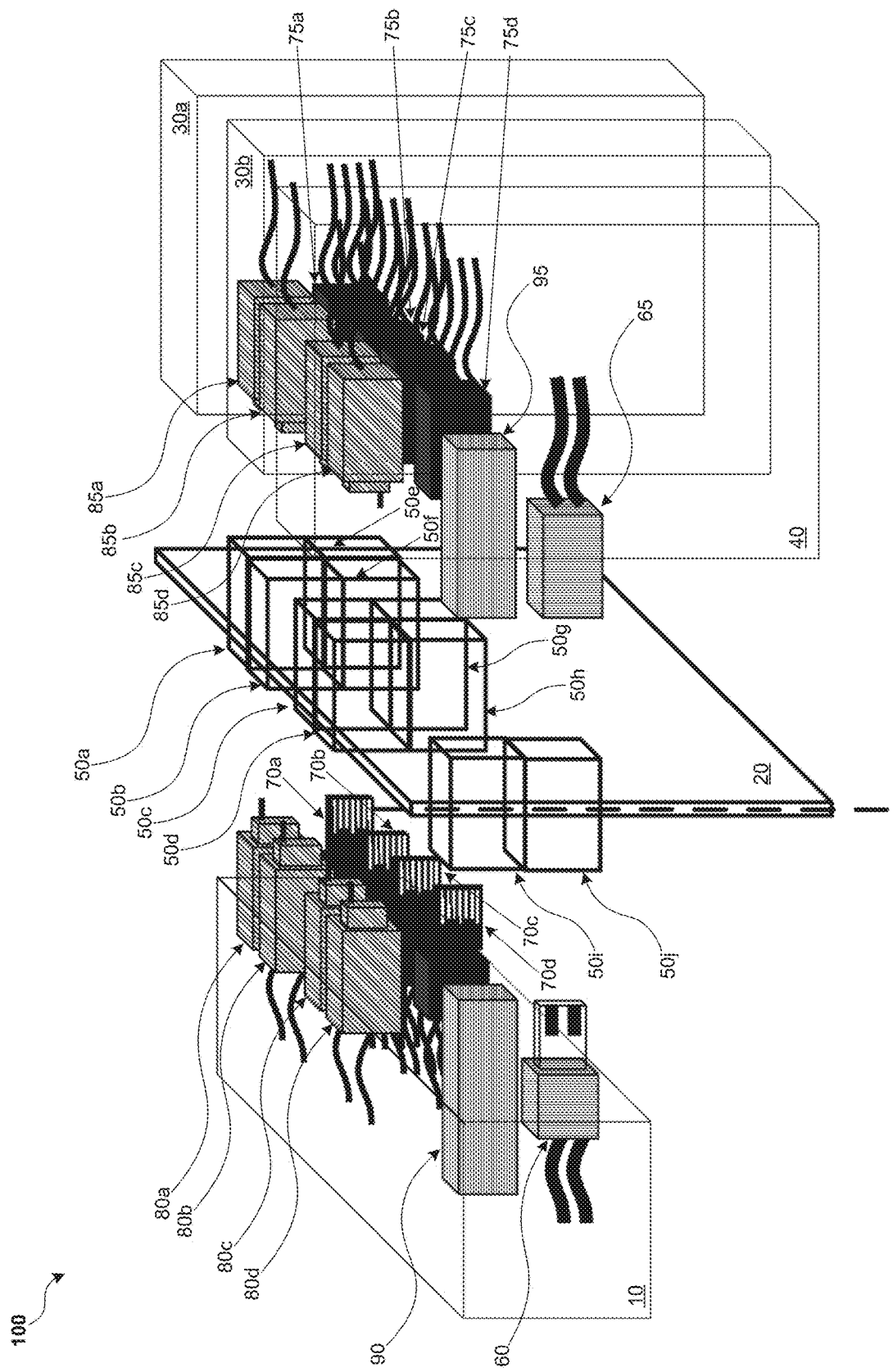
FIG. 1 is a diagram of an example high-density optical system, including multiple universal-blindmate sleeves installed in a midplane for blindmating various blindmate connectors, according to some embodiments.

The figures are not exhaustive and do not limit the present disclosure to the precise form disclosed.

DETAILED DESCRIPTION

Various embodiments described herein are directed to blindmate connector sleeves having a modular and adaptive structure to accept blindmate connectors of varying types. For purposes of discussion, the various mechanisms and techniques of the disclosed embodiments may be referred to herein as universal-blindmate sleeves. In contrast to some existing sleeves (or adaptors) that may be specifically designed for dedicated use with a particular type of blindmate connector, the disclosed universal-blindmate sleeve can accept a range of different blindmate connectors. As disclosed in detail below, a universal-blindmate sleeve is designed to accept various blindmate connectors, including but not limited to: optical blindmate connectors; electrical signal blindmate connectors; electrical power blindmate connectors; and cooling conduit blindmate connectors. Accordingly, universal-blindmate sleeves provide reliable optical and electrical couplings between modules in a high-density optical system and the components therein, allowing these modules to leverage optical and electrical components deemed necessary to be optimized for emerging technologies, such as high-performance systems (e.g., connected with low-latency, high-bandwidth fabrics).

Even further, the universal-blindmate sleeves can reliably mate with cooling conduit connectors that allow for adequate cooling of the high-density components. Also, the universal-blindmate sleeves can be modularly installed, for instance in a midplane, either individually or as an assembly (comprised of multiple universal-blindmate sleeves) for blindmating complimentary connectors directly through the respective sleeve (e.g., without requiring additional adaptors/connectors). Thus, employing universal-blindmate sleeves in the manner disclosed can reduce the cost and complexity associated with some high-density fabric systems to accommodate for blindmating each of the various types of blindmate connectors (e.g., employing expensive blindmate connectors or requiring cumbersome configurations including a plurality of differing blindmate adaptors/connectors).

Many applications of optical interconnection networks may require complex fabric topologies to interconnect multiple compute nodes, memory nodes, and I/O nodes via fabric nodes (e.g., switches). Optical connectivity consisting of optical transceivers, optical connectors, and optical cables, are fundamental to form the connections which comprise the optical network fabric. Some optical connectivity techniques use electrical connectivity within the system, and optical connectivity across systems. Accordingly, elements within many high-density optical systems are designed to support electrical connectors for intra-system connections, for example.

Some currently existing high-density optical systems employ modular hardware configurations, comprising a system enclosure (e.g., mounted to a rack) that can further include electrical midplanes/backplanes. As an example, electrical blindmate connectors can be used to electrically couple elements that are front-loaded in a system enclosure, such as compute nodes (or blade servers), to elements that are rear-loaded in a system enclosure, such as fabric aggregation modules (or switches) in a substantially fixed configuration via the electrical midplane. Furthermore, electrical connectors can be fixed mounted on a backplane printed circuit board (PCB) in the system, requiring over-provisioning (e.g., robust configurations including large numbers of electrical connector contacts and electrical traces) for peak system configurations. Consequently, many electrical traces and electrical connector contacts that are included in the midplane implementation are unused (e.g., low and mid-range system configurations), which leads to inefficient implementations and significant cost burdens. In some cases, the electrical connectors and traces on the midplane may be under-provisioned when higher bandwidth requirements may need to be supported through the midplane. Once the electrical midplane is implemented, any changes to the midplane will require the replacement of the midplane. Thus, as the supported data rate increases, electrical midplanes may become increasingly more robust but they will be also rigid, inflexible and expensive. Furthermore, electrical connectors implemented on a midplane may become outdated as data rate increases further, making the entire enclosure housing the midplane to be consequently outdated and unusable. The disclosed universal-blindmate sleeves are modularly designed for implementations that are re-configurable, allowing for electrical couplings that are not fixed connections (e.g., cable-terminated electrical blindmate connectors that can be easily disconnected and/or adjusted). Thus, universal-blindmate sleeves can realize improvements to electrical midplanes that may experience some design limitations but have the benefit of being widely used in the industry.

Additionally, a universal-sleeve midplane can be referred to as a hybrid midplane since it can support both electrical connections and optical connections. Hybrid midplanes can have increased flexibility regarding connectivity through the midplane (e.g., not restricted to use only electrical connectors or optical connectors) as compared to more traditional electrical midplanes. Although optical-based solutions may become dominant in the area of high-performance systems, the use of electrical connectivity may remain desirable in some capacities. For example, high-performance system may continue to utilize electrical connections for electrical power and system management signals. Thus, as trends in high-performance systems continue to advance, a shift away from electro-mechanical designs, and towards electro-optical-mechanical designed systems that more seamlessly integrate optical connectivity solutions, such as hybrid midplanes, may arise. Universal-blindmate sleeves can leverage the benefits associated with the electro-optical capabilities of these hybrid midplanes, due to their unique design that enables the sleeves to accept both electrical blindmate connectors and optical blindmate connectors.

FIG. 1 is a diagram of an example high-density optical system 100, including multiple universal-blindmate sleeves 50a-50j installed in a midplane 20 for co-blindmating various blindmate connectors. As disclosed herein the term "co-blindmating" means a system module blindmating with multiple other system modules by using different types of connectors, i.e., electrical signal, electrical power, optical and cooling conduit, substantially together. FIG. 1 illustrates that the hardware configuration of the high-density optical system 100 can be a modular system including multiple modules that may be inter-connected within the system 100, and further connected to additional devices and/or systems external to the system 100. In the illustrated example, the system 100 includes: a fabric aggregation module 10; multiple compute modules 30a, 30b; and a power/cooling module 40. In particular, FIG. 1 serves to illustrate an example of blindmating the fabric aggregation module 10 to the compute modules 30a, 30b and the power/cooling module 40 via the universal-blindmate sleeves 50a-50j disposed on the midplane 20. The aforementioned modules can be inside of a larger structure, such as a system enclosure (not shown) that provides structural support for the smaller modules and/or subsystems to be installed therein.

For purposes of illustration, the right and left sections of FIG. 1 (with respect to a dashed-line of demarcation indicating a separation between the sections referred to herein) represent a front and a rear of a system enclosure, respectively. The midplane 20 can separate the rear portion (i.e., left) of this system enclosure, which includes the fabric aggregation module 10, from the front portion (i.e., right), which includes the compute modules 30a, 30b and the power/cooling module 40. As alluded to above, the blindmating illustrated in FIG. 1 accomplishes coupling the fabric aggregation module 10 at the rear of the system enclosure to the modules in the front of the system enclosure through the midplane 20. The universal-blindmate sleeves 50a-50j, in accordance with the embodiments, allow flexibility in selecting the particular interfaces used in coupling the fabric aggregation module 10 to the front-loaded modules, namely the power/cooling module 40 and the compute modules 30a, 30b. For example, a variable number of interfaces, and varying types of interfaces can exist between the modules as deemed appropriate for the desired implementation. The types of interfaces can be selected from: electrical signal interfaces (e.g., for low-speed and/or high data speed), electrical power interfaces, optical signal (e.g., for high-data speed) interfaces, and cooling conduit (e.g., for cooling) interfaces, where each interface is supported by a respective connector type. Thus, different configurations that can include differing numbers and types of blindmate connectors coupling the modules (corresponding to the selected interfaces) can all be mated through the universal-blindmate sleeves 50a-50j in the midplane 20, thereby enabling the flexible-choice high-density connectivity described above.

As a general description, the universal-blindmate sleeves 50a-50j can be described as apparatuses mounted onto the midplane 20 and secured in manner allowing the universal-blindmate sleeves 50a-50j to remain stationary during blindmating. Each of the universal-blindmate sleeves 50a-50j include a sleeve housing having a generally rectangular-shaped structure, where the exterior surface of the housing can protect against debris and particles, such as dust, that may damage contact ends of the connectors. However, it should be appreciated that the disclosed sleeve housing is not limited to the rectangular-shaped structure shown in FIG. 1 and can be structured to have various other geometries and dimensions as deemed appropriate. For example, a circular-shaped, an oval-shaped or an octagon-shaped structure may be used (e.g., in instances when most connector types are desired to be shaped as such). FIG. 1 shows that the universal-blindmate sleeves 50a-50j have an open internal volume, where the inside of the extended portion of the housing is substantially hallow. Each of the distal ends of the universal-blindmate sleeves 50a-50j have a respective opening (that may be covered by shutters as discussed in reference to FIG. 3A), where a pair of complimentary blindmate connectors can be inserted and mated within the internal volume of the sleeve. For example, during the blindmating in FIG. 1, optical blindmate connector 80a can be inserted into an opening of the universal-blindmate sleeve 50a at the housing end that is disposed at the rear of the system enclosure. The complimentary optical blindmate connector 85a can be inserted into the opening at the opposing end of the universal-blindmate sleeve 50a, which is disposed at the front of the system enclosure. As a result of applying force during blindmating, a stable and reliable physical coupling between optical blindmate connector 80a and optical blindmate connector 85a can be achieved within the universal-blindmate sleeve 50a. As discussed in further detail below, for example regarding FIG. 3A-3B, other orientations and configurations for the universal-blindmate sleeves are disclosed.

As seen in FIG. 1, the high-density optical system 100 can include a fabric aggregation module 10 installed at the rear of the system enclosure, as alluded to above. The system 100 can facilitate optical connectivity, via the fabric aggregation module 10, in manner that provides scalable optical fabric topologies. In an example computer networking environment, the fabric aggregation module 10 can be implemented as optical switches that drive the functionality of the system 100. Implemented as optical switches, the fabric aggregation module 10 can use optical connectivity technology to send and receive data transmissions as well as to determine the destination and/or routing for data, much like a common networking switch. Employing optical connectivity provides multiple advantages related to high-speed and high-bandwidth. Data bandwidth may be scaled within each optical fiber by using high modulation rates and/or multiple optical signal carrier wavelengths multiplexed within each optical fiber, requiring fewer connection points of optical fibers compared to electrical signal contacts to be blindmated through the universal-blindmate sleeves. Moreover, reliability of the system 100 can be enhanced, since signals transmitted via optical fibers, in most cases are not affected by interference from electromagnetic waves (eliminating the effect of noise in fiber optic technology).

Additionally, FIG. 1 shows that the fabric aggregation module 10 can have a plurality of blindmate connectors attached thereto. As described above, the number of blindmate connectors and the types of blindmate connectors that may be coupled to the fabric aggregation module 10 can be adaptively selected. In the illustrated example, the fabric aggregation module 10 is particularly configured to include: multiple optical blindmate connectors 80a-80d; multiple electrical signal blindmate connectors 70a-70d; an electrical power blindmate connector 60; and a cooling conduit blindmate connector 90. The optical blindmate connectors 80a-80d can be opto-mechanical devices used to align and couple at least two optical fibers together, thereby providing a means for attaching to (and decoupling from) an optical component such as optical switches. The electrical power blindmate connector 60 can be an electro-mechanical device for coupling to a power supply, shown as the power/cooling module 40. Thus, the electrical power blindmate connector 60 provides a means to route electrical power (within the system enclosure) to the fabric aggregation module 10. Furthermore, the electrical signal connectors 70a-70d can be electro-mechanical devices that support high-density electrical signals (e.g., high speed), for instance signaling to and from a system enclosure manager (not shown) for monitoring and controlling the system 100.

As a general description, the blindmate connectors attached to the fabric aggregation module 10 can be configured as plugs. That is, regarding FIG. 1, the optical blindmate connectors 80a-80d, electrical power blindmate connector 60, electrical signal blindmate connectors 70a-70d, and cooling conduit blindmate connector 90 are structured with male portions, or extended components, arranged on an exterior surface that will cooperate with the interiorly conical, or female portions, of complimentary receptacle connectors. These receptacle connectors may be attached to the front-loaded modules, such as the compute modules 30a, 30b, and the power/cooling module 40 (as discussed in greater detail below). The plug-receptacle configurations of the blindmate connectors can assist in stably joining the two connectors together during blindmating the fabric aggregation module 10 to the compute modules 30a, 30b through the universal-blindmate sleeves 50a-50j, as illustrated in FIG. 1. It should be appreciated that for purposes of illustration, cooling conduit blindmate connectors 90, 95 are generally described as air conduits throughout the disclosure as an example, although a cooling conduit may be implemented using other known cooling conduit mechanisms, such as liquid conduits. Additionally, in another example, the front modules may have plug connectors and the rear modules may have receptacle connectors. In yet another example, the connectors in the front and the rear modules may have Hermaphroditic connectors (i.e., gender-less connectors where a blindmate connector having a plug on one corner end and a receptacle on the other corner end mating to an opposing blindmate connector that is oriented with 180-degree rotation allowing the plug-half of each connector mating to the receptacle-half of the opposing connector).

In some examples, the compute modules 30a,30b are blades that consist of high-density processors providing the computing power for a data center, for example. In the example of FIG. 1, the compute modules 30a, 30b are installed in the front portion of the system enclosure (e.g., within mounting structures, such as front bays separated by divider rails) of the system 100. By residing in the same system enclosure, compute modules 30a, 30b can share common system enclosure resources, such as power and cooling provided by power/cooling module 40. FIG. 1 also shows that blindmate connectors are coupled to the compute modules 30a, 30b. As illustrated, optical blindmate connectors 85a, 85b and electrical signal blindmate connectors 75a, 75b are attached to compute module 30a. Furthermore, optical blindmate connectors 85c, 85d and electrical signal blindmate connectors 75c, 75d are coupled to compute module 30b.

The midplane 20 can provide holes for the compute modules 30a, 30b to directly couple to the fabric aggregation module 10 in the example blindmating of FIG. 1. As seen in FIG. 1, the midplane 20 may hold the universal-blindmate sleeves 50a-50j mounted thereon. In some examples, the midplane 20 can include electrical connectors (e.g., high power delivery) in addition to the universal-blindmate sleeves 50a-50j. Further, as shown in FIG. 1, the compute modules 30a, 30b can be arranged in a vertical orientation, while the fabric aggregation module 10 is arranged in a horizontal orientation allowing it to blindmate with both compute modules 30a, 30b. Accordingly, each of the respective printed circuit boards (PCB) for the abovementioned modules will be similarly oriented. Restated, the PCBs of the compute modules 30a, 30b can have a vertical orientation, and the PCB of the fabric I/O module 10 can have a horizontal orientation. In the instances when electrical blindmate connectors are fixed-mounted on the PCB of the respective module, the electrical signal blindmate connectors 70a-70d may be in a position that is perpendicularly angled (90°) to the electrical signal blindmate connectors 85a-85d during blindmating. This perpendicular orientation may require that the connectors be designed in a manner that is more optimal for direct-orthogonal-blindmating but may be associated with design drawbacks. For example, orthogonal electrical connectors may include longer contacts that can limit the overall electrical performance of the connector and limit the number of rows of electrical contacts that may be used (in turn limiting the density). In contrast, employing universal-blindmate sleeves 50a-50j can mitigate the need for orthogonal connections in the configuration of FIG. 1. Electrical signal blindmate connectors 70a-70d, 75a-75d can be coupled to the PCB by means of electrical cables that can be adaptively oriented for coupling through the universal-blindmate sleeves 50a-50d (rather than a direct coupling of fixed electrical connectors). Thus, according to the embodiments, the electrical signal blindmate connectors 70a-70d, 75a-75d can be implemented using high-density electrical signal connectors, thereby supporting higher performance electrical signals and higher density given the arrangement. According to the embodiments, universal-blindmate sleeves 50a-50j can be used with cable-terminated electrical connectors and/or PCB-mounted connectors. In some cases, cable-terminated electrical connectors have mechanical tolerance-float features and are more flexible to connect to components disposed on a system board. In some other cases, cable-terminated electrical connectors have lower losses and thus can support higher-speed data rates compared to PCB-mounted connectors and PCB traces.

The specific locations and proximal arrangement of the multiple universal-blindmate sleeves 50a-50j within the midplane 20 may be based on various factors, such as accommodating the dimensions of the modules and/or supporting structures, a predetermined spacing between sleeves, alignment with known positions of connectors, and the like. The universal-blindmate sleeves 50a-50j can be fixedly mounted to the midplane 20, or otherwise securely attached to the midplane 20 in the manner that allows for detaching. Moreover, the universal-blindmate sleeves 50a-50j can be modularly mounted to the midplane 20. As an example, a single universal-blindmate sleeve 50i can be individually mounted to the midplane 20. Another universal-blindmate sleeve 50j can be placed in a position adjacent to the universal-blindmate sleeve 50i, shown as directly below (relative to the vertical y axis). Thus, the universal-blindmate sleeves 50i, 50j can be described as forming a modular array having two rows and one column (i.e., 2×1 array). Alternatively, multiple universal-blindmate sleeves, such as universal-blindmate sleeves 50a, 50b, 50e, 50f can be mounted to the midplane 20 together as an array assembly. In this case, the universal-blindmate sleeves 50a, 50b, 50e, 50f can be described as a modular array comprised of two rows, and two columns (i.e., 2×2 array). In some examples, an array assembly can be constructed as a single array apparatus (e.g., monolithic part). Universal-blindmate sleeves 50c, 50d, 50g, 50h can be mounted to the midplane 20 together as an array assembly in a similar fashion. It should be appreciated that the array assemblies shown in FIG. 1 are for purposes of illustration, and universal-blindmate sleeves 50a-50j are designed to accommodate various other modular arrangements in the midplane 20 as deemed appropriate or necessary. For instance, the midplane 20 can have an implementation where universal-sleeves 50a-50j are arranged in different positions and including more/fewer sleeves than universal-sleeves 50a-50j. The adaptably modular configuration features of the universal-blindmate sleeves 50a-50j are discussed in greater detail in reference to FIGS. 5A-5B, for example. Also, the modularity associated with the universal-blindmate sleeves, in accordance with the embodiments, can circumvent the pre-provisioning of specific interface choices that is required in traditional midplane implementations, thereby realizing advantages such as reduced costs and complexity.

Continuing with the example blindmating in FIG. 1, blindmating the fabric aggregation module 10 to the compute module 30a involves: mating optical blindmate connector 80a with optical blindmate connector 85b through the universal-blindmate sleeve 50a; mating optical blindmate connector 80b with optical blindmate connector 85b through universal-blindmate sleeve 50b; mating electrical signal blindmate connector 70a with electrical signal blindmate connector 75a through 50e; and mating electrical signal blindmate connector 70b with electrical signal blindmate connector 75b through 50f. Further, blindmating the fabric aggregation module 10 to the compute module 30b involves: mating optical blindmate connector 80c with optical blindmate connector 85c through the universal-blindmate sleeve 50c; mating optical blindmate connector 80d with optical blindmate connector 85d through universal-blindmate sleeve 50d; mating electrical signal blindmate connector 70c with electrical signal blindmate connector 75c through 50g; and mating electrical signal blindmate connector 70d with electrical signal blindmate connector 75d through 50h.

Also, FIG. 1 shows that the fabric aggregation module 10 can be blindmated to the power/cooling module 40. The high-power electrical and optical components of system 100 may tend to generate a large amount of heat, which may lead to further concerns regarding heat extraction and airflow inside of the system enclosure. Accordingly, it may be desirable to integrate cooling components in the system enclosure along with the modules, allowing for adequate cooling of the system 100. As an example, an optical switch line-card may consume higher than 1200 W of power. Heat associated with such high levels of power consumption, may need to be extracted from the system enclosure. FIG. 1 shows that a power/cooling module 40 can be installed and can include fans (not shown) and other cooling components to address heat concerns. Typically, hot air travels from the front of the system enclosure to the rear of the system enclosure, which can cause challenges in cooling the rear-loaded modules, such as the fabric aggregation module 10. Universal-blindmate sleeve 50i can accept cooling conduit blindmate connectors 90, 95, allowing cooling conduits, such as air conduits, to be used within the system enclosure, in a manner that allows the air flow impedance to be controlled downstream. For example, a cooling conduit is a mechanism, like a duct, that can be used to direct cool air generated from fans of the power/cooling module 40 to travel to another section of the system enclosure. Thus, using cooling conduits, fans can push the cool air from the power/cooling module 40 at the front of the system enclosure to reach the fabric aggregation module 10 at the rear of the system enclosure. Moreover, universal-blindmate sleeve 50*i* can be modularly arranged in the midplane 20, allowing flexibility in the use of cooling conduits. For instance, the number of cooling conduits installed may be vary as deemed appropriate to adapt to various considerations, such as the size of the fabric aggregation module 10. A larger module may require several cooling conduits to provide an adequate amount of cooling to the rear of the system enclosure. Thus, the midplane 20 can include universal-blindmate sleeves in addition to universal-blindmate sleeve 50*i*, to accommodate for more cooling conduits. As shown in FIG. 1, a cooling conduit connector 90 can be coupled to the fabric I/O module 10 and mated. During blindmating, the cooling conduit connector 90 can be mated, via universal-blindmate sleeve 50*i*, with a cooling conduit connector 95 attached to the power/cooling module 40. Coupling the cooling conduit connectors 90, 95 effectively couples portions of a cooling conduit routed through the modules, creating a passage for the air to flow through. Continuing with the example blindmating in FIG. 1, blindmating the fabric aggregation module 10 to the power/cooling module 40 involves: mating electrical power connector 60 with electrical connector 65 through the universal-blindmate sleeve 50*j*; and mating cooling conduit connector 90 to cooling conduit connector 95 through universal-blindmate sleeve 50*i*. For purposes of illustration, the power/cooling module 40 is shown to be implemented as one module. However, it should be appreciated that the power delivery and cooling delivery capabilities of the power/cooling module 40 can be implemented using distinct modules for each, as deemed appropriate. Although it is not illustrated, liquid line quick disconnects may be used instead of air conduits for the cooling conduits in a liquid-cooled system.

As alluded to above, the universal-blindmate sleeves are designed to accept varying types of blindmate connectors, such as optical blindmate connectors, electrical blindmate connectors, and cooling conduit blindmate connectors. As a general description, FIGS. 2A-2D show a pair of complimentary blindmate connectors being inserted into the universal-blindmate sleeve 50. Referring now to FIG. 2A, an example of a universal-blindmate sleeve 50 is shown. The universal-blindmate sleeve 50 can include a housing, illustrated as a rectangularly-shaped member. Sections of the universal-blindmate sleeve 50 along the length of the housing (e.g., in the horizontal plane) are elongated, as compared to sections along the width of the housing (e.g., in the vertical plane) that are relatively shorter. There are openings at each of the distal ends of the sleeve housing. The universal-sleeve 50 is shown accepting an optical blindmate connector 80, which can be a plug, at an opening of the first end of the sleeve 50. An optical blindmate connector 85, which can be configured as a receptacle, is accepted at the opening of an opposing end of the sleeve 50, in a similar manner.

As an example, the optical blindmate connector 80, or plug, can be initially inserted into the universal-blindmate sleeve 50. The complimentary optical blindmate connector 85, or receptacle, is initially shown as being aligned with universal-blindmate sleeve 50 for insertion. It should be understood that by aligning the optical blindmate connectors 80, 85 with the universal-blindmate sleeve 50, the optical blindmate connectors 80, 85 themselves are also aligned to be properly blindmated. Then, as force is applied, the optical blindmate connectors 80, 85 may move along the mating axis, and further towards each other within the cavity of the universal-blindmate sleeve 50. Blindmating can conclude, as the optical blindmate connectors 80, 85 are fully seated inside of the universal-blindmate sleeve 50. In some cases, fully inserting each of the optical blindmate connectors 80, 85 into the universal-blindmate sleeve 50 results in a reliable physical mating of the connectors 80, 85, and thereby allowing their respective optical fibers to be optically coupled at their mating surfaces. For purposes of brevity, blindmating the connectors shown in FIGS. 2B-2D within the universal-blindmate sleeve 50 is accomplished in a manner similar to the sequence discussed above in reference to FIG. 2A, and therefore is not discussed in detail again.

FIG. 2B shows another example of a universal-blindmate sleeve 50, accepting an electrical signal connector 70 configured as a plug, and an electrical signal blindmate connector 75 configured as a receptacle. In FIG. 2C, another example of the universal-blindmate connector 50 is shown, accepting an electrical power blindmate connector 60 configured as a plug, and another electrical power blindmate connector 65 configured as a receptacle. In yet another example of a universal-blindmate sleeve 50, in FIG. 2D, the sleeve 50 is illustrated as accepting a cooling conduit blindmate connector 90 configured as a plug, and a cooling conduit connector 95 configured as a receptacle. FIGS. 2A-2D serve to illustrate that the universal-blindmate sleeve 50 can receive each of the different blindmate connector types, while maintaining a sleeve structure that is commonly shared, or universal (irrespective of the connector inserted therein). Restated, the same universal-blindmate sleeve 50 can be used for each of the varying connectors seen in FIGS. 2A-2D. It should be appreciated that the particulate dimensions of the universal-blindmate connector 50 can be selected to accommodate the various connectors used.

In some implementations, the universal-blindmate sleeves can include shutters. Referring to FIG. 3A, a top view of an example universal-sleeve 50 including shutters 51*a*, 51*b* is shown. In the illustrated example, the universal-blindmate sleeve 50 includes a pair of shutters 51*a*, 51*b* at each of the opening of the distal ends of the sleeve housing. A shutter 51*a* can be generally described as a flap overlaying a lateral edge of the universal-blindmate sleeve 50, capable of movement between open and close positions. The shutters 51*a* may be constructed of a rigid material, such as metal, in order to be used as protective covering over the openings of the universal-blindmate sleeve 50. For example, the shutters 51*a*, 51*b* can prevent contaminants, such as dust, from entering the universal-blindmate sleeve 50, thereby protecting the connectors housed therein from adverse effects. This protection can be particularly advantageous in the case of optical blindmate connectors 80, 85, which are very sensitive to contaminants like dust, that can degrade the performance of the optical fibers (e.g., damage optical end, insertion loss, and degradation of return loss). Furthermore, the shutters 51*a*, 51*b* can be employed to control air flow. For instance, opening shutters 51*a*, 51*b* allows air to freely flow through the universal-blindmate sleeve 50, assisting in the downstream control of air flow between the front and back of the system enclosure, as alluded to above. As an example, it may be desirable to cool a switch module by fans positioned above and/or below the switch modules, since fans are typically located in the rear part of an enclosure to pull cool air through the front modules to cool the high-power components in the front modules. A switch module may have air intake on the sides to allow cool air from the front of the enclosure to be fed through the side air channels, where the midplane area of the switch can allow the fans (above and/or below) to cause negative air pressure in the switch module and allowing the cool air to be moved through the switch module. The shutters 51a, 51b of a universal-blindmate sleeve 50 (especially for the sleeves that are not used for blindmating) are needed to accomplish this "loop cooling" air movement. Otherwise, air from the front modules will be pulled through these sleeves and the switch modules will not have the cool air from the side channels moved through the switch module.

In FIG. 3A, shutters 51a, 51b are mounted on a respective pivot 54a, 54b. The pivots 54a, 54b can be fixedly mounted to the universal-blindmate sleeve 50, in manner that allows rotatable movement and further enabling the shutters 51a, 51b to move from the affixed point (at the pivots 54a, 54a). The shutters 51a, 51b can include a tab (not shown), which engages the shutter 51a, 51b in response to force being exerted against the shutter 51a, 51b. Accordingly, in the example of blindmating, when optical blindmate connector 80 is initially pressed against shutter 51a, the tab can effectuate movement of the shutter 51a from a closed position (collapsed against the sleeve housing) to an open position (extending away from the sleeve housing). As blindmating continues, and mating force is still applied to the optical blindmate connector 80 causing it to move farther within the cavity of the universal-blindmate sleeve 50. Correspondingly, the shutter 51a opens further. FIG. 3A illustrates that greater blindmating force may be applied to optical blindmate connector 80, as the optical blindmate connector 80 is inserted at a distance farther within the universal-blindmate sleeve 50, than optical blindmate connector 85 (e.g., closer to the opening). In turn, this greater blindmating force, causes shutter 51a to extend farther away from the universal-blindmate sleeve 50 than shutter 51b. Moreover, a tab can function to prevent unintended contact between an electrical blindmate connector and a metal shutter 51a, 51b. Undesirable conditions, such as an electrical short, may occur if an electrical contact of a connector accidently touches the metal shutter 51a, 51b during blindmating. Consequently, the tabs can prop open the shutters 51a, 51b at the very initial stages of sliding an electrical blindmate connector into a universal-blindmate sleeve 50. This clearance space mitigates the potential of the tip of the electrical blindmate connector touching the shutters 51a, 51b during insertion.

In some embodiments, the shutters 51a, 51b may be arranged to cooperatively cover an entirety of the respective openings of the universal-blindmate sleeve 50. In some embodiments, the shutters 51a, 51b may overlap when in the closed position. Additionally, the universal-blindmate sleeve 50 can include a biasing member (not shown) that applies a small force causing the shutters 51a, 51b to rest in the closed position. Consequently, the shutters 51a, 51b remain closed until insertion of a connector engages the respective shutter 51a, 51b to open. FIG. 3B is a side view of the example universal-blindmate sleeve 50. For purposes of brevity, elements of the universal-blindmate sleeve 50 that are similarly shown in FIG. 3A are not discussed in detail again in reference to FIG. 3B.

Figure 4A:
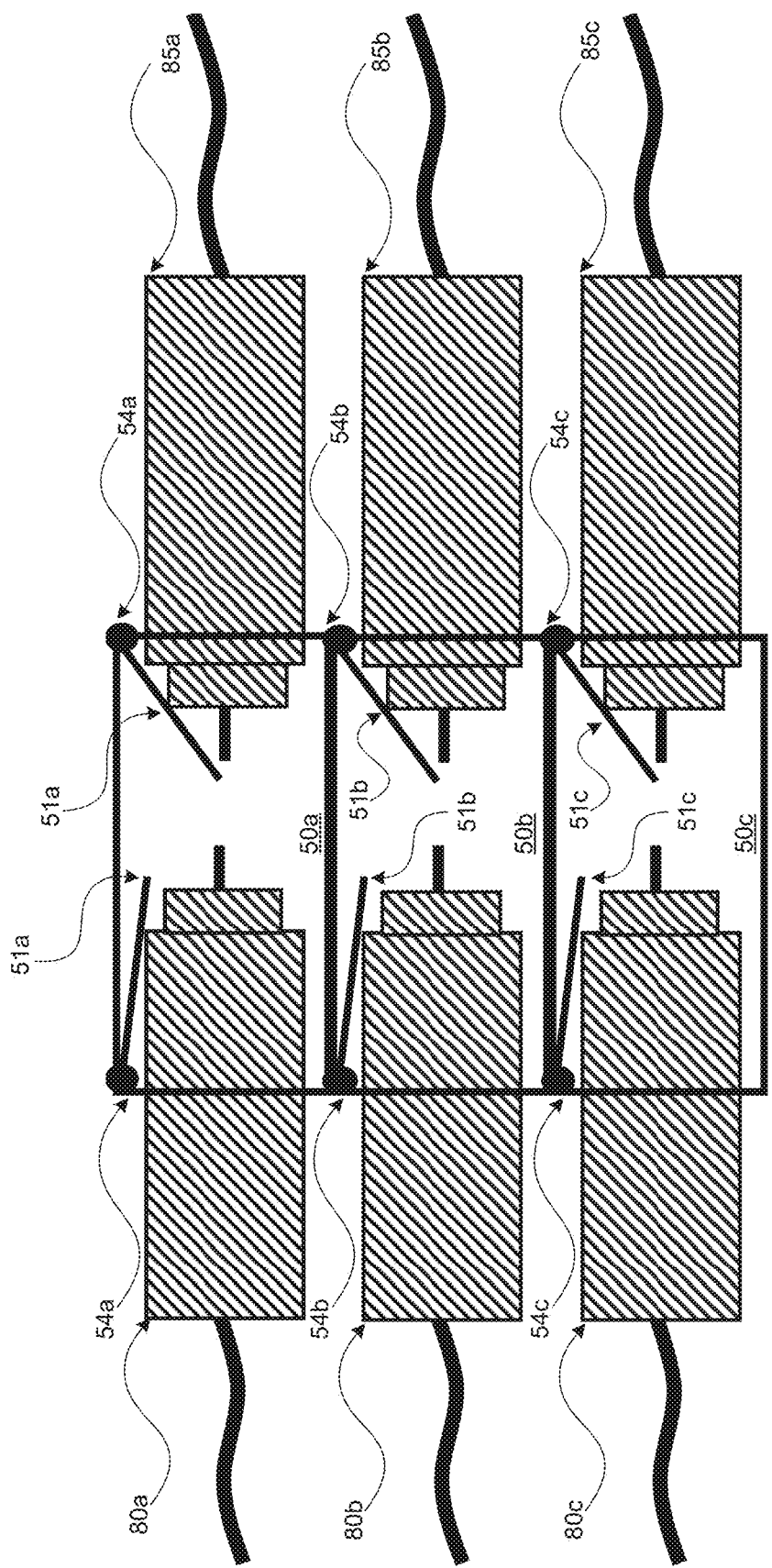
FIG. 4A is an example of multiple universal-blindmate sleeves arranged in an array configuration and employed for blindmating optical blindmate connecters shown in FIG. 2A, according to some embodiments.

FIG. 4A is an example of multiple universal-blindmate sleeves 50a-50c arranged in an array assembly configuration. As discussed in detail above in reference to FIG. 1, an array assembly of universal-blindmate sleeves can have a modular configuration, including a varying number of sleeves in various arrangements. In the illustrated example, multiple universal-blindmate sleeves 50a-50c are positioned in a vertically aligned arrangement, or a column. The housing of universal-blindmate sleeve 50c is positioned directly below universal-blindmate sleeve 50b (oriented with respect to the length of the sleeve housing). In turn, universal-blindmate sleeve 50b is positioned directly below universal-blindmate sleeve 50a (oriented with respect to the length of the sleeve housing). The resulting arrangement in FIG. 4A forms a 3×1 array, where each of the universal-blindmate sleeve 50a-50c comprising the array assembly are used for blindmating respective optical blindmate connectors 80a-80c with their corresponding complimentary optical blindmate connectors 85a-85c. FIG. 4A also shows that each of the universal-blindmate sleeves 50a-50c includes a respective pair of independent shutters 51a, 51b.

In some embodiments, the respective pair of shutters 51a, 51b in each of the universal-blindmate sleeves 50a-50c can be ganged together, or otherwise attached. In the ganged shutter embodiment, the pairs of shutters 51a, 51b can have an implementation that is more integrated into the assembly, and different from the individual pairs of shutters 51a,51b previously discussed. For example, shutter 51a in universal-blindmate sleeve 50a can be, at least partially, coupled to the shutter 51a of universal-blindmate sleeve 50b, by way of sharing an external wall of the assembly (disposed on the end of the sleeve housing accepting optical blindmate connectors 80a, 80b, 80c). In contrast, shutters 51a, 51b in universal-blindmate sleeve 50a would be individually modular and independent of the shutters 51a,51b of universal-blindmate sleeve 50b in the individual shutter embodiment, previously discussed.

Figure 4B:
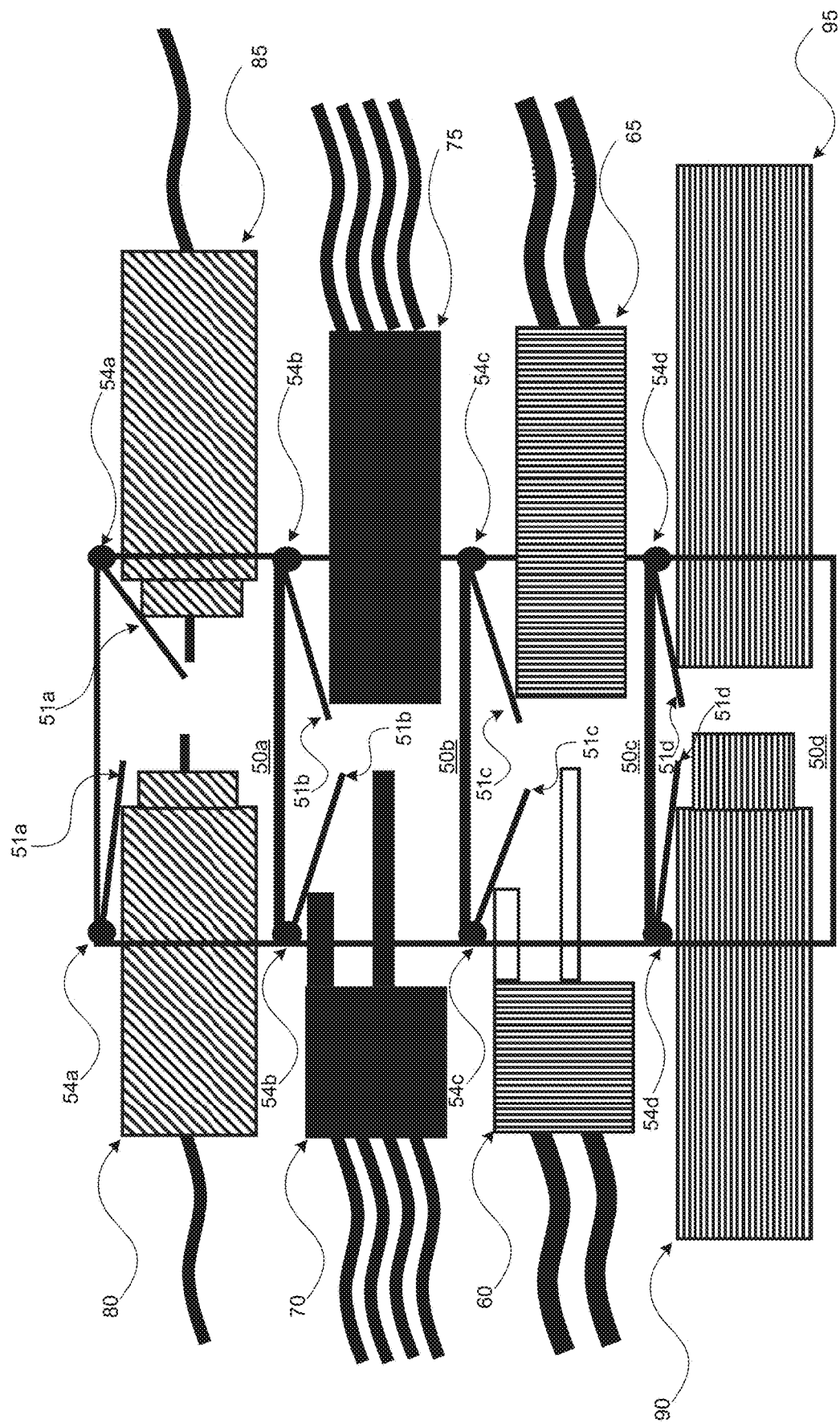
FIG. 4B is another example of multiple universal-blindmate sleeves arranged in an array configuration and employed for blindmating optical blindmate connectors, electrical signal blindmate connectors, electrical power blindmate connectors, and cooling conduit blindmate connectors shown in FIGS. 2A-2D, according to some embodiments.

In reference to FIG. 4B, another example of an array assembly of universal-blindmate sleeves 50a-50d is shown. The example includes universal-blindmate sleeves 50a-50d arranged in a 4×1 array. Like the configuration in FIG. 4A, the array assembly in FIG. 4B can be generally described as universal-blindmate sleeves 50a-50d vertically arranged in a column. It is important to note that FIG. 4A illustrates an array assembly, where each universal sleeve therein receives the same type of blindmate connector. Alternatively, in FIG. 4B, each of the universal-blindmate sleeves 50a-50d are used with a different type of blindmate connector, illustrating the "universal" structure of the sleeves 50a-50d. This "universal" structure allows the same universal-blindmate sleeves to be installed in an enclosure, where different modules are inserted having different connector types that can all blindmate through these same sleeves (as further illustrated in FIGS. 4A-4C). In detail, universal-blindmate sleeve 50a is shown accepting optical blindmate connectors 80, 85. Universal-blindmate sleeve 50b is shown accepting electrical signal blindmate connectors 70, 75. Universal-blindmate sleeve 50c is shown accepting electrical power blindmate connectors 60, 65. Universal-blindmate sleeve 50d is shown accepting cooling conduit blindmate connectors 90, 95. In some embodiments, an array assembly can be designed to have a particular configuration. Thus, an array assembly can be replicated, producing a plurality of array assemblies that maintain a fixed sleeve count, in a certain arrangement. For instance, replicating the illustrated example of FIG. 4B, produces multiple array assemblies having four universal-blindmate sleeves 50a-50d arranged in a column. Employing pre-provisioned array assemblies to implement a midplane can provide tradeoffs relative to employing individual universal-blindmate sleeves shown in FIGS. 2A-2D. Individual universal-blindmate sleeves may provide more flexibility regarding configurability (i.e., configuration of universal-blindmate sleeves can be completely customized for the midplane implementation). However, array assemblies may require less installation overhead than installing individual universal-blindmate sleeves in the midplane. For example, an array assembly including five sleeves may use fewer mounting mechanisms (e.g., screws) than independently mounting five individual universal-blindmate sleeves. Thus, array assemblies of universal-blindmate sleeves may be optimal in instances when ease of installation, and reduced installation over head is desired (e.g., large-scale midplanes requiring high sleeve count).

Figure 4C:
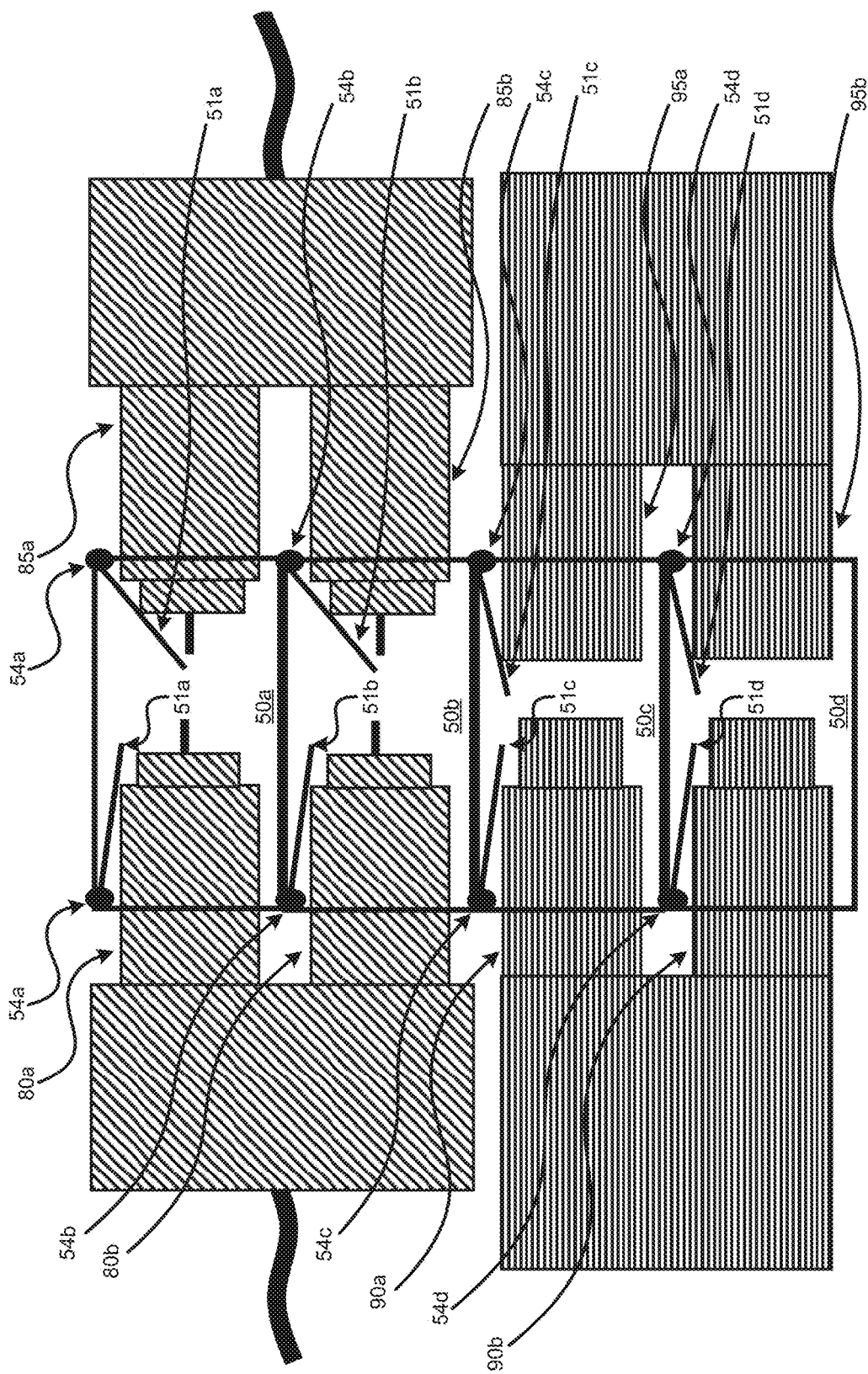
FIG. 4C is another example of multiple universal-blindmate sleeves arranged in an array configuration and employed for blindmating ganged blindmate connectors, according to some embodiments.

FIG. 4C is another example of multiple universal-blindmate sleeves 50a-50d arranged in an array configuration. As seen in FIG. 4C, optical blindmate connectors 80a, 80b and optical blindmate connectors 85a, 85b are respectively ganged together. Similarly, cooling conduit blindmate connectors 90a, 90b and cooling conduit blindmate connectors 95a, 95b are ganged together. According to the embodiments, the universal-blindmate sleeves 50a-50d are designed to reliably receive these types of ganged blindmate connectors, in a manner that allows for secure blindmating. In the example, optical blindmate connectors 80a, 80b are shown to be attached at the base, in manner that forms a single part. Thus, ganged optical blindmate connectors 80a, 80b can function as a dual-plug. Similarly, ganged optical blindmate connectors 85, 85b can be a dual-receptacle. During blindmating, each of the dual-plugs of optical blindmate connector 80a, 80b are accepted by a respective universal-blindmate sleeve 50a, 50b. Applying blindmating force to the base of the ganged optical blindmate connectors 85, 85b may move both the dual-plugs along the mating axis simultaneously, inserting the connectors 80a, 80b into the respective universal-blindmate sleeve 50a, 50b. In a like fashion, optical blindmate connectors 85a, 85b can be accepted by the respective universal-blindmate sleeve 50a, 50b, allowing the dual-receptacles to the co-blindmate with the dual-plugs within the universal-blindmate sleeves 50a, 50b.

Continuing with FIG. 4C, the ganged cooling conduit blindmate connectors 90a, 90b are inserted together into a distal end of the respective universal-blindmate sleeves 50c, 50d. Also, ganged cooling conduit blindmate connectors 95a, 95b are inserted together into the opposite distal end of the respective universal-blindmate sleeves 50c, 50d. Accordingly, ganged cooling conduit blindmate connectors 90a, 90b can be concurrently co-blindmated with ganged cooling conduit blindmate connectors 90a, 90b inside of universal-blindmate sleeves 50c, 50d, respectively. In the case of liquid cooling, ganged liquid conduits can be used for implementing a liquid supply and liquid return conduit pair. It should be appreciated that although ganging together two blindmate connectors are illustrated in the example of FIG. 4C, a different number of blindmate connectors may be similarly ganged together as deemed necessary or appropriate. For instance, the cooling conduits may be liquid conduits to cool high-power components and air conduits to cool low-power components in a switch module. In some cases, universal-blindmate sleeves according to the embodiments, are structured to accommodate for the varying numbers of ganged blindmate connectors.

In reference to FIG. 5A, another example of multiple universal-blindmate sleeves 50a-50d arranged in a particular configuration is shown. The midplane is omitted in FIG. 5A for simplicity. FIG. 5A shows that multiple universal-blindmate sleeves 50a-50d can be placed in adjacent positions, for example within the midplane (shown in FIG. 1). Varying the configuration of the universal-blindmate sleeves 50a-50d may be advantageous in different scenarios, such as: 1) for different system configurations, the number of universal-blindmate sleeves may be limited by blocking the holes on the midplane in place of the unpopulated sleeves, (2) universal-blindmate sleeves may coexist with fix-mounted midplane electrical connectors where there may be electrical signal and/or power traces to be routed on the midplane PCB spaces between the sleeves, and (3) heavier-duty shutters may be needed for some applications that need to entirely cover the sleeve opening and also require sizeable gaskets that may occupy the midplane spaces between the sleeves. Additionally, FIG. 5A illustrates that there is an amount of empty space allotted between each of the universal-blindmate sleeves 50a-50d. The universal-blindmate sleeves 50a-50d in FIG. 5A are not arranged in a contiguous configuration, like in the case of an array assembly of universal-blindmate sleeves described above in reference to FIGS. 4A-4C. In detail, the sleeve housing of universal-blindmate sleeve 50a does not contact the adjacent universal-blindmate sleeve 50b. This illustrates yet another example of the modularity and flexibility that can be achieved using universal-blindmate sleeves 50a-50c. The universal-blindmate sleeves 50a-50d can be principally arranged relative to the position of the plug-in modules, rather than the other adjacent universal-blindmate sleeves (e.g., in the case of monolithic array assembly). For instance, universal-blindmate sleeve 50b can be spaced away from an adjacent universal-blindmate sleeve 50a at an adaptable distance. The flexible configuration can allow universal-blindmate sleeve 50b to be positioned in a midplane such that the sleeve's openings align with the optical blindmate connectors 80, 85 its configured to receive. Also, allowing universal-blindmate sleeve 50a to be positioned in manner that optimally aligns the sleeve 50a for receiving cooling conduit blindmate connectors 90, 95. Similarly, universal-blindmate sleeve 50c can be placed in a position to be in alignment with the electrical signal blindmate connectors 70, 75, and universal-blindmate sleeve 50d can be placed in a position to be in alignment with the electrical power blindmate connectors 60, 65. As alluded to above, the modular design of the universal-blindmate sleeves 50a-50d allows such flexibility to be realized.

In some embodiments, a solid sleeve that is not used for blindmating, also referred to as a "dummy" sleeve is employed. One or more "dummy" sleeves (not shown) can be inserted into open spaces between the universal-blindmate sleeve 50a-50d, to block holes in the midplane that may be undesirable. Moreover, in some cases, to further increase adaptability, the universal-blindmate sleeves 50a-50d are designed to be various sizes that are deemed most optimal for the types of connectors used in the midplane implementation. For instance, universal-blindmate sleeve 50a can be designed to have dimensions that are determined most suitable for blindmating the cooling conduit blindmate connectors 90a, 90b. In some cases, the dimensions of the universal-blindmate sleeves 50a-50d can be based on several different factors, including connector specifications for a manufacturer, connector characteristics and/or capabilities, and the like. In some cases, the various dimensions and/or sizes of the universal-blindmate sleeves 50a-50d are not intended to be exhaustive and arbitrary but are selected from a finite number of options. For instance, the universal-blindmate sleeves 50a-50d may be configured to fit the dimensions of one of a large, medium, or small sized sleeve.

Referring now to FIG. 5B, the multiple universal-blindmate sleeves 50a-50d are shown to be arranged in an array assembly. The midplane is omitted in FIG. 5B for simplicity. FIG. 5B shows the universal-blindmate sleeves 50a-50d are particularly arranged in horizontally aligned configuration (with respect to the widths of the sleeve housing), forming a 1×4 array on the midplane. The array assembly of FIG. 5B, including universal-sleeves 50a-50d, can be constructed together as a single part (also described above), or array apparatus. In some embodiments, each section of the part that corresponds to a distinct universal-blindmate sleeve 50a-50d (accepting a respective blindmate connector) is separated, or otherwise delineated, by a dividing mechanism. The dividing mechanisms (discussed in greater detail in reference to FIGS. 6A-6B) can be implemented as divider walls or dividing rails. Thus, in FIG. 5B, the contacting surfaces between each adjacent universal-blindmate sleeves 50a-50d may be a position of a dividing mechanism. Moreover, FIG. 5B illustrates that each of the universal-blindmate sleeves 50a-50d, even within the same array assembly, can blindmate a different pair of connector types therein. Specifically, universal-blindmate sleeve 50a is shown as accepting cooling conduit blindmate connectors 90, 95. Universal-blindmate sleeve 50b is shown as accepting optical blindmate connectors 80, 85. Universal-blindmate sleeve 50c is shown as accepting electrical signal blindmate connectors 70, 75. Universal-blindmate sleeve 50d is shown as accepting electrical power blindmate connectors 60, 65. Thus, according to some embodiments, the universal-blindmate sleeves can be implemented as an array assembly, having a variable number of sleeves arranged in a row orientation (M), and variable number sleeves arranged in a column orientation (N) to construct a N×M array.

FIGS. 5C-5D illustrate examples of multiple universal-blindmate sleeves 50a-50d arranged in a configuration similar to that shown in FIG. 5A. Although the configurations of the universal-blindmate sleeves 50a-50d are substantially the same, each example shows a different group of blindmate connector types being blindmated therein. Accordingly, FIGS. 5B-5C serve to further illustrate the "universal" aspects of the disclosed universal-blindmate sleeves 50a-50d, which allow the same arrangement to be employed for various blindmate connectors. In detail, FIG. 5C shows universal-blindmate sleeve 50a accepting cooling conduit blindmate connectors 90, 95. Universal-blindmate sleeve 50b is shown accepting optical blindmate connectors 80, 85. Universal-blindmate sleeves 50c, 50d are both shown accepting electrical signal blindmate connectors 70a, 75a and electrical signal blindmate connectors 70b, 75b, respectively.

In now referring to FIG. 5D, universal-blindmate sleeves 50a-50c are all shown as accepting optical blindmate connectors. In the example, universal-blindmate sleeve 50a is accepting optical blindmate connectors 80a, 85a. Universal-blindmate sleeve 50b is accepting optical blindmate connectors 80b, 85b. Universal-blindmate sleeve 50c is accepting optical blindmate connectors 80c, 85c. Universal-blindmate sleeve 50d is accepting electrical signal blindmate connector 70, 75. The universal-blindmate connectors 50a-50d have a design that can be widely used amongst various types of blindmate connectors. Consequently, using universal-blindmate sleeves 50a-50d allow great flexibility in interface choices for blindmating modules in a high-density optical system. As an example, universal-blindmate sleeves 50a-50d arranged in the same configuration can be installed in a midplane and be used to blindmate modules including each of the varied interface combinations illustrated in FIGS. 5A-5D. Furthermore, this interface flexibility provided by universal-blindmate connectors 50a-50d may eliminate the need to pre-populate the midplane with fixed mounted blindmate connectors. Mounting blindmate connectors to the midplane may not be desirable, as this approach may lead to a midplane implementation that is inflexible, expensive, and bulky. Maintaining a complimentary set of blindmate connectors on each mating module, is all that is required to blindmate modules through the universal-blindmate sleeves 50a-50d.

Figure 6A:
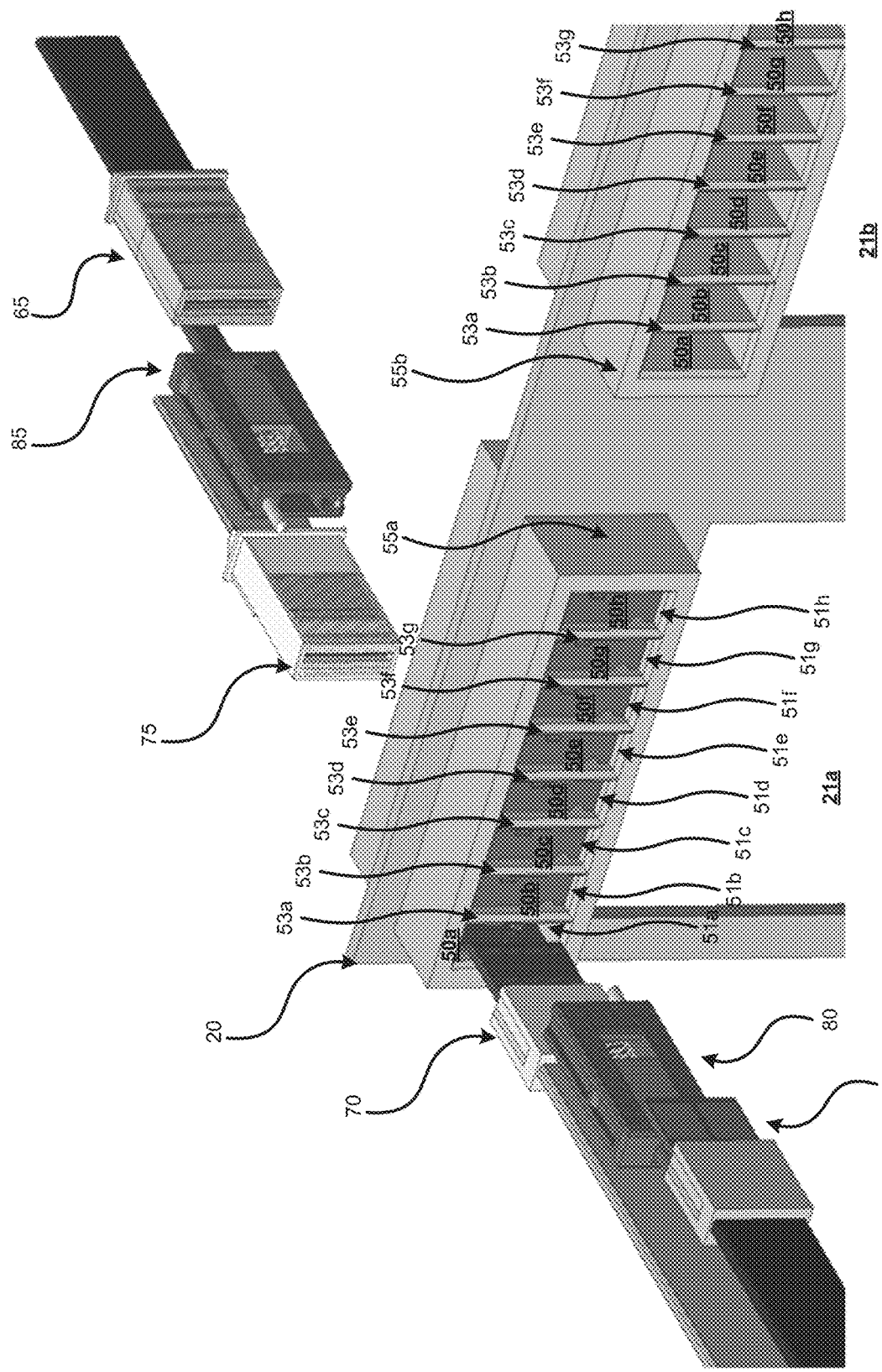
FIG. 6A is a diagram illustrating an example of a universal-blindmate sleeve array including divider walls and installed in a midplane for blindmating various blindmate connectors shown in FIG. 1, according to some embodiments.

FIG. 6A is a diagram illustrating an example of universal-blindmate sleeve array assemblies 55a, 55b installed in a midplane 20. As previously discussed in reference to FIG. 1, a midplane 20 can include holes that may be used to mount universal-blindmate sleeves, as disclosed herein. The midplane 20, as shown, also includes air vent holes 21a, 21b. In FIG. 6A, a first array assembly 55a, and a second array assembly 55b are installed in a midplane 20. Each of the array assemblies 55a, 55b respectively include multiple universal-blindmate sleeves 50a-50h. Particularly, the array assemblies 55a, 55b are configured as 1×8 arrays, comprising eight universal-blindmate sleeves 50a-50h. Also, each of the universal-blindmate sleeves 50a-50h have corresponding shutters 51a-51h attached thereto. In the illustrated example, each of the array assemblies 55a, 55b is constructed as a single part, or apparatus. As an array apparatus, the universal-blindmate sleeves 50a-50h can be easily installed inside of an opening of the midplane 20 altogether as one structure.

The array assemblies 55a, 55b are modularly mounted to the midplane 20 in a configuration that aligns the universal-blindmate sleeves 50a-50h perpendicular to the midplane 20. FIG. 6A shows that the elongated section of the sleeve housings for universal-blindmate sleeves 50a-50h cross the vertical plane of the midplane 20. In this configuration, the universal-blindmate sleeves 50a-50h are positioned such that a first opening (of each of the respective sleeves 50a-50h) is disposed at a first side of the midplane 20, and a second opening (of each of the respective sleeves 50a-50h) is disposed at the opposite side of the midplane 20. In some cases, the array assemblies 55a, 55b may have mounting ears (not shown) and are fixedly mounted to the midplane 20 using attaching mechanisms, such as screws, nuts, etc. (not shown). Alternatively, the array assemblies 55a, 55b can be securely mounted to the midplane 20 in manner that is not fixed, for instance using sliding or spring latching installation techniques (also not shown). When the array assemblies 55a, 55b are fully installed, the universal-blindmate sleeves 50a-50h securely attached to the midplane and arranged to allow modules situated on either side of the midplane 20 to blindmate through the universal-blindmate sleeves 50a-50h. It should be appreciated that the modularity of the array assemblies 55a, 55b allows the elements, such as damaged connectors, or due to system configuration changes, to be easily removed from the midplane 20 when necessary (e.g., without taking apart the system enclosure).

In FIG. 6A, the array assemblies 55a, 55b are constructed to include divider walls 53a-53g. The divider walls 53a-53g can be rigid members that extend the width of the array assemblies 55a, 55b (e.g., top to bottom). Each of the divider walls 53a-53g serves as a separating "wall" between each of the universal-blindmate sleeves 50a-50h, defining the area for the particular sleeve within the respective array assembly 55a, 55b. Accordingly, the universal-blindmate sleeves 50a-50h can accept a blindmate connector in the area enclosed by adjacent divider walls 53a-53g. In the example of FIG. 6A, an electrical signal blindmate connector 70, which is configured as a plug, is being received by an opening of universal-blindmate sleeve 50a. As seen, the electrical signal blindmate connector 70 is inserted into the universal-blindmate sleeve 50a, pushing open the corresponding shutter 51a. Another opening of the universal-blindmate sleeve 50a, facing the opposite side of the midplane 20, is shown as accepting a complimentary electrical signal blindmate connector 75. The electrical signal blindmate connector 75 is configured as a receptacle in this case. The electrical signal blindmate connectors 70, 75 may be attached to modules (not shown) located at the respective sides of the midplane 20. The electrical blindmate connectors 70, 75 can be mated within the universal-blindmate sleeve 50a, and electrically coupling the associated modules. Optical blindmate connectors 80, 85 can be accepted by, and subsequently mated within, universal-blindmate sleeve 50b in a manner similar to that described above. Similarly, electrical power blindmate connectors 60, 65 can be blindmated inside of universal-blindmate sleeve 50c.

Figure 6B:
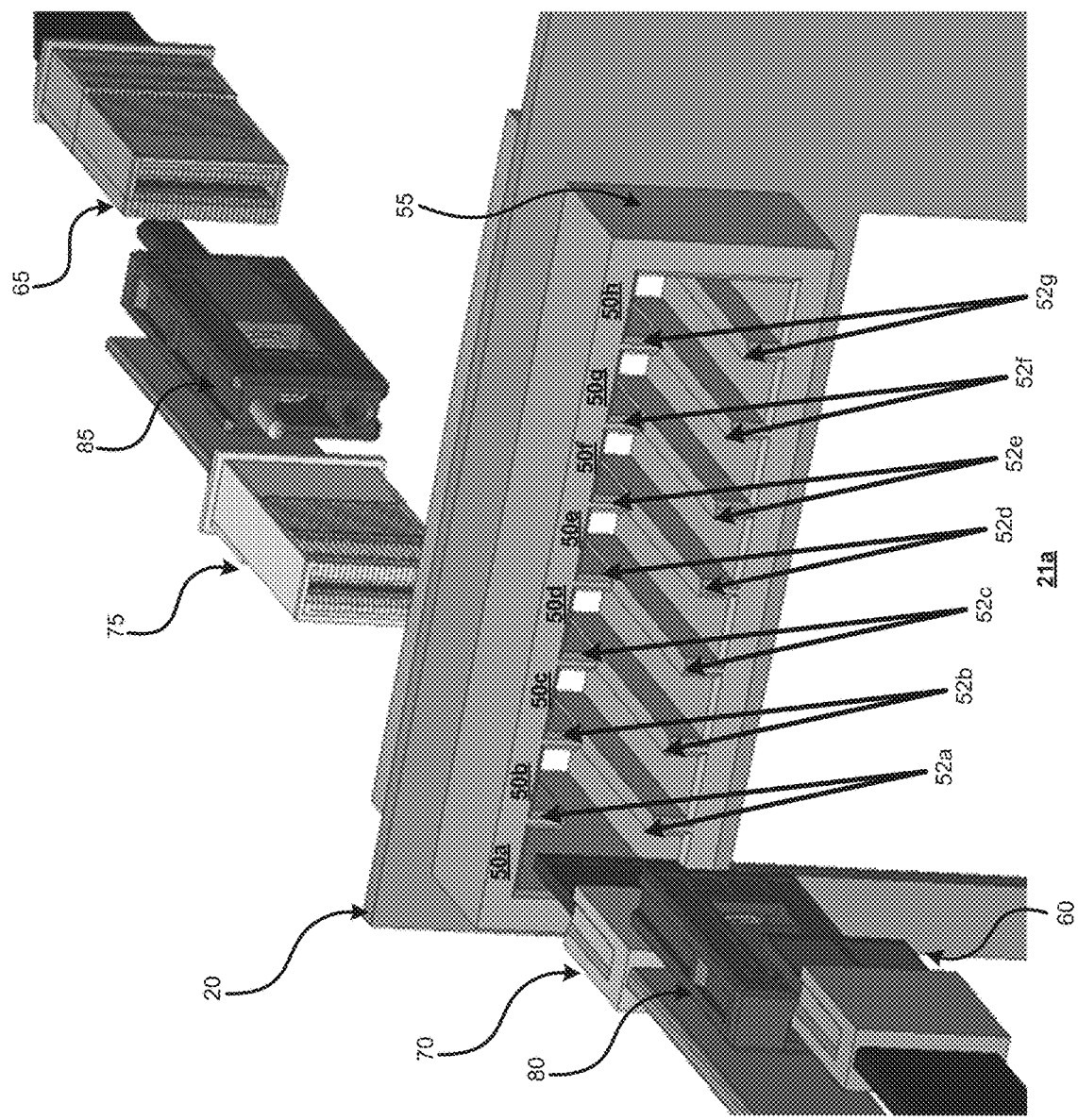
FIG. 6B is a diagram illustrating an example of a universal-blindmate sleeve array including divider rails and installed in a midplane for blindmating various blindmate connectors shown in FIG. 1, according to some embodiments.

Now, referring to FIG. 6B, example array assemblies 55a, 55b are constructed to include divider rails 52a-52g. Divider rails 52a-52g are constructed as a pair of members that partially extend the width of the array assemblies 55a, 55b. In the example, divider rails 52a-52g include a first member, that is attached to a top surface of the respective array assembly 55a, 55b, and extending downward. Additionally, a second member of the divider rails 52a-52g, is attached to the bottom surface of the respective assembly 55a, 55b and extending upward. The divider rails 52a-52g do not completely wall-off adjacent universal-blindmate sleeves 50a-50h in the manner of divider walls (as discussed in reference to FIG. 6A). As a result, the divider rails 52a-52g have a less rigid design and provide more flexibility, as compared to the divider wall implementation of FIG. 6A. For instance, a connector housing can include two electrical connectors arranged side-by-side. The connector housing may be constructed to include notches that allow the connector housing to slide through the divider walls, permitting both connectors to be accepted in a single sleeve. For purposes of brevity, elements of the universal-blindmate sleeves 50a-50h (or interacting therewith) that are similarly shown in FIG. 6A are not discussed in detail again in reference to FIG. 6B.

Figure 7A:
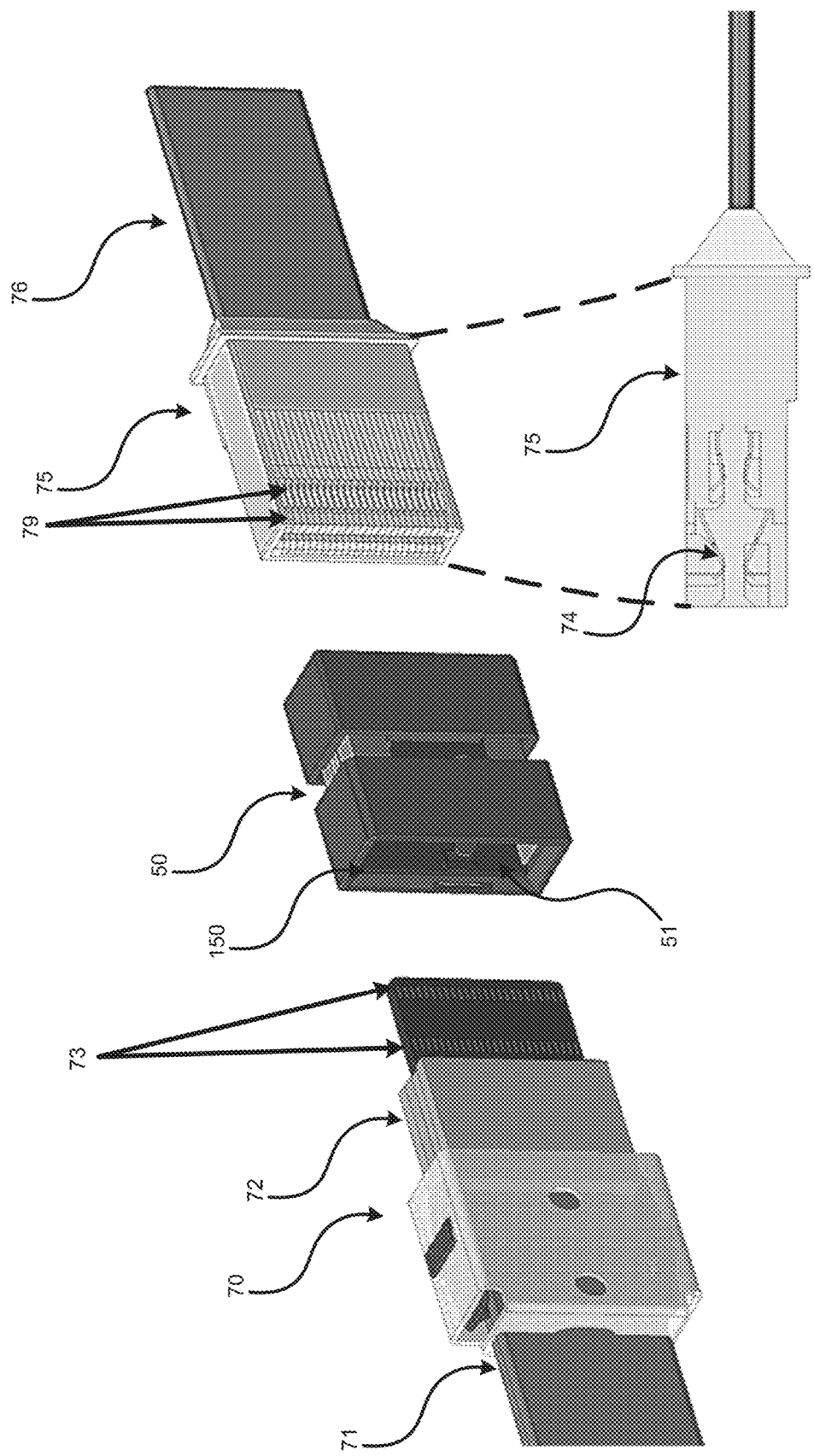
FIG. 7A is a perspective view of an example of mating electrical signal blindmate connectors employing a universal-blindmate sleeve, according to some embodiments.

FIG. 7A is a perspective view of an example mating of electrical signal blindmate connectors 70, 75 through a universal-blindmate sleeve 50. According to the embodiments, features have been implemented related to blindmating electrical signal blindmate connectors 70, 75 through a universal-blindmate sleeve 50 to support high-speed connectivity. The electrical signal blindmate connector 70 is illustrated as a cable-terminated plug, attached to cable 71. The electrical signal blindmate connector 75 is illustrated as a cable-terminated receptacle 70. FIG. 7A serves to illustrate that the disclosed embodiments employ high-density electrical signal blindmate connectors 70. As seen, electrical signal blindmate connector 70 includes multiple rows of electrical contacts 73 disposed on the male portion, or mating portion, of the electrical signal blindmate connector 70. The rows of electrical contacts 73 are designed to gain high-density for high-speed signals. FIG. 7A also prominently illustrates an individual electrical contact 74, which is designed for high-density signaling and integrated into the mating portion of the plug connector, namely electrical signal blindmate connector 70. The receptacle connector, electrical signal blindmate connector 75, includes multiple rows of contact points 79. The rows of contact points 79 on the receptacle, are the counterparts to the rows of contacts 73, on the plug. Thus, the rows of contact points 79 on electrical signal blindmate connector 75 correspondingly receive the rows of electrical contacts 73 disposed on the electrical signal blindmate connector 70, during blindmating. Configuring the universal-blindmate sleeve 50 components and techniques to leverage the use of these high-density electrical signal blindmate connectors 70, 75 can achieve high-density electrical connections without requiring the use of traditional high volumetric and expensive midplane mounted connectors. Moreover, additional features can be implemented on the mating portion of the electrical signal blindmate connector 70, or plug, to improve electrical coupling within the universal-blindmate sleeve 50 and realize high-density connectivity.

FIG. 7A shows an electrical signal blindmate connector 70, a universal-blindmate sleeve 50, a receptacle connector 75 (in perspective view) and the receptacle connector 75 (in top cross-sectional view) showing the beam contacts 74. The plug connector has a plug contact feature 73 where electrical contacts are disposed on. The plug contact feature 73 is also the lead-in feature for the connector 70 to initially be inserted in the universal-blindmate sleeve 50 by push-opening the shutter 51. The connector 70 has a sleeve-alignment feature 72 configured on the body of the electrical signal blindmate connector 70. The sleeve-alignment feature 72 can enable alignment within the universal-blindmate sleeve 50. In FIG. 7A, the sleeve-alignment feature 72 can be one or more lateral edges that extended from the body of the connector 70 (e.g., from the mating surface) that can be received by the recessed edges 150 along the housing body of universal-blindmate sleeve 50. Accordingly, the universal-blindmate sleeve 50 can stably accept and align the electrical signal blindmate connector 70 during insertion. The electrical signal blindmate connector 75 has receptacle lead-in feature 79 for the universal-blindmate sleeve 50 to stably accept the connector 75. The connector 75 also has electrical contacts 74 (e.g., beam contacts) to electrically couple with the plug contact feature 73 of the connector 70 when the connector 75 and the connector 70 are blindmated with the universal-blindmate sleeve 50.

Figure 7B:
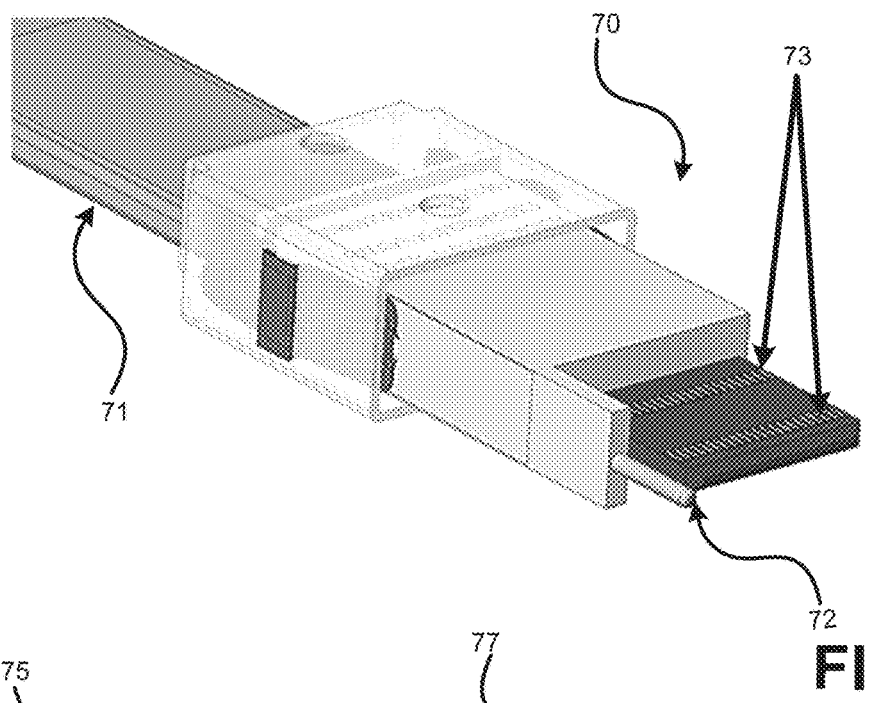
FIG. 7B is a perspective view of an example of an electrical signal blindmate connector configured as the plug for the blindmating shown in FIG. 1, according to some embodiments.

FIG. 7B is a perspective view of the electrical signal blindmate connector 70. In FIG. 7B, a pin 72 is attached to the body of the connector 70 as another implementation for an alignment feature. The pin 72 is structured as a male portion, and in the illustrated example, circularly shaped. During blindmating, the pin 72 can be inserted into the complimentary alignment features 77 of the receptacle (shown in FIG. 7D) to ensure that connectors are properly aligned within the universal-blindmate sleeve.

Figure 7C:
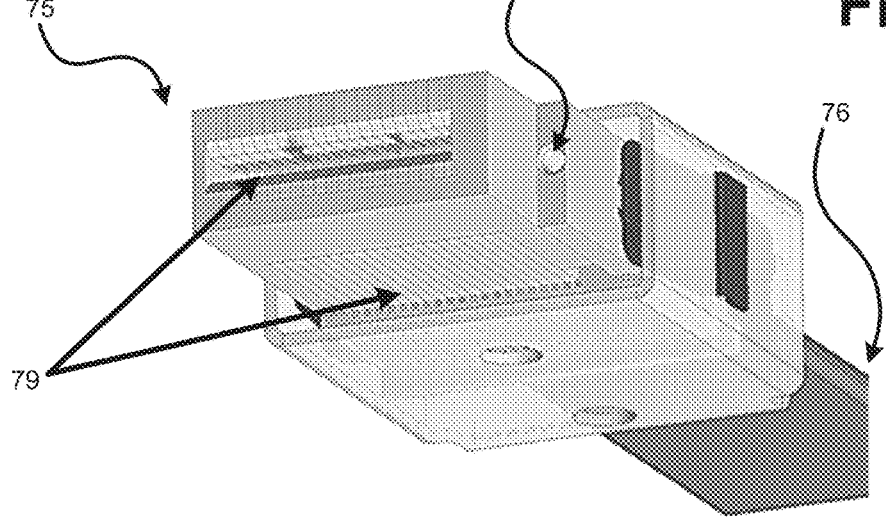
FIG. 7C is a perspective view of an example of an electrical signal blindmate connector configured as the receptacle for the blindmating shown in FIG. 1, according to some embodiments.

FIG. 7C is a perspective view of electrical signal blindmate connector 75, or receptacle. The connector 75 can include an alignment feature, structured as a hole 79. The hole 77 can be an or opening along the front face of the connector housing, usable for proper alignment and mating. As an example, the hole 77 can be positioned housing of the electrical signal blindmate connector 75 such that, once pin (shown in FIG. 7B) extending from the blindmate plug connector is inserted into the holes 77, the connectors 70, 75 are properly aligned (e.g., allowing the proper complimentary elements to interact to achieve electrical coupling).

Figure 7D:
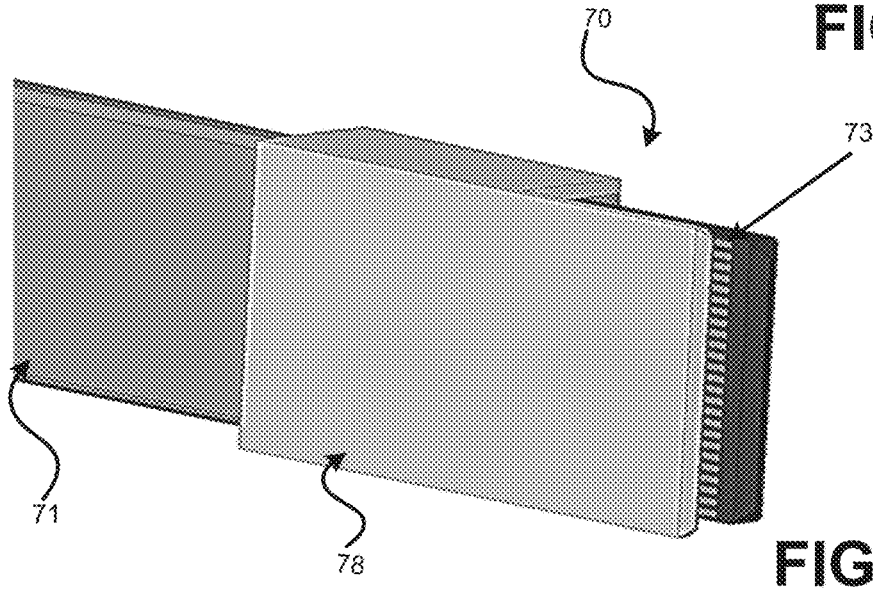
FIG. 7D is another perspective view of an example of an electrical signal blindmate connector configured as the plug for the blindmating shown in FIG. 1, according to some embodiments.

Referring now to FIG. 7D, a perspective view of yet another example for the electrical signal blindmate connector 70. The view proximately shows a shield 78 constructed to extend from the body of the electrical signal blindmate connector 70. Shield 78 protrudes from the body in manner that covers the electrical contacts 73 of the electrical signal blindmate connector 70 to prevent metal shutters of the universal-blindmate sleeve 50 from coming into contact with the electrical contacts 73 (potentially causing an electrical short).

Figure 8:
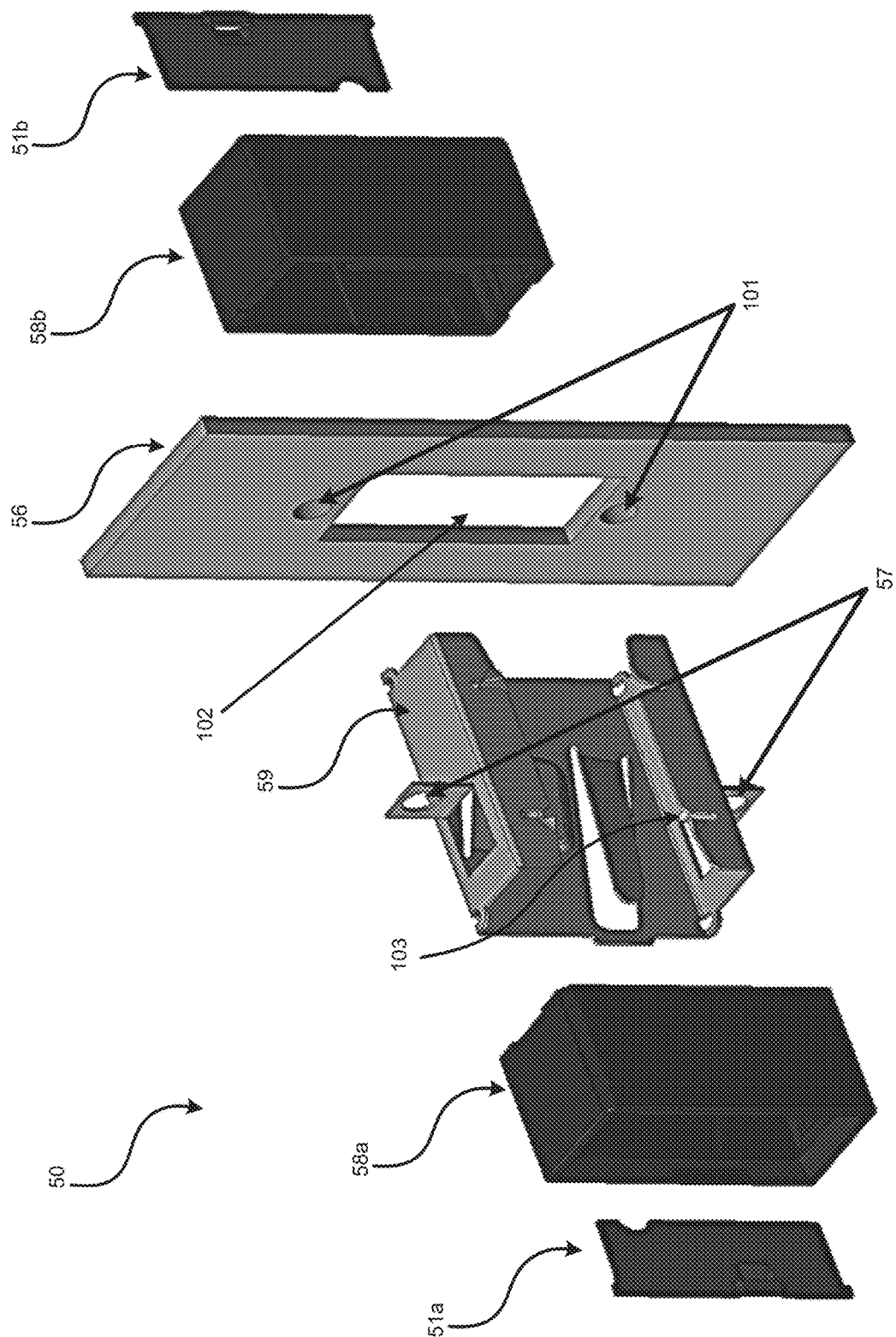
FIG. 8 is an exploded view of an example of a universal-blindmate sleeve including multiple components thereof, according to some embodiments.

FIG. 8 is an exploded view of an example of a universal-blindmate sleeve 50 including multiple components thereof, according to some embodiments. The various components are discussed starting from the center element, namely mounting plane 56, and concluding with the most external elements shutters 51a, 51b. The mounting plane 56, is illustrated as a panel that may be suitable for securely and stably mounting the universal-blindmate sleeve 50 thereto. Various surfaces can serve as the mounting plane 56 for the universal-blindmate sleeve 50. Examples of a mounting plane 56 can include but are not limited to: PCB; faceplate; bulkhead; midplane board; and the like. The universal-blindmate sleeve 50 may include a sleeve core 59. The sleeve core 59 can be a generally rectangularly shaped and elongated structure, which serves as the housing body (e.g., center section) of the universal-blindmate sleeve 50. The sleeve core 59 can have a substantially open internal volume, or cavity, allowing space for blindmating within the universal-blindmate sleeve 50. Moreover, the sleeve core 59 is configured for mounting onto the aforementioned mounting plane 56. For example, the sleeve core 59 can be inserted through hole 102, such that the mounting plane 56 can provide structural support necessary for installing the universal-blindmate sleeve 50. The mounting plane 56 includes mounting holes 101. The sleeve core 59 includes two mounting flanges with holes 57 that can be correspondingly aligned over the mounting holes 101 on the mounting plane 56, allowing screws (not shown) to be inserted through for mounting and securing the sleeve core 59 onto the mounting plane 56. After fully installing the sleeve core 59 in the mounting plane 56, the universal-blindmate sleeve 50 can be stably mounted for blindmating through the universal-blindmate sleeve 50.

Still referring to FIG. 8, the universal-blindmate sleeve 50 may include sleeve shells 58a, 58b. Sleeve shells 58a, 58b can be attached to each of the distal ends of the sleeve core 59. For instance, the sleeve shells 58a, 58b can be slid over the ends of the sleeve core 59, where extended portions of the sleeve core 59 can be mated into grooves along the inside of the sleeve shells 58a, 58b. Also, the sleeve shells 58a, 58b can presses onto sleeve core 95 to secure the sleeve shells 58a, 58b to the ends of the sleeve core 59. The sleeve shells 58a, 58b can be configured to provide rough alignment of the connectors during the initial stages of blindmating through the universal-blindmate sleeve 50. Shutters 51a, 51b can be mounted along with the respective sleeve shell 58a, 58b, in manner that covers the open portion of the sleeve shells 58a, 58b. The sleeve shell 58a, 58b are retained on the sleeve core 59 by means of internal retention features 103. For purposes of brevity, shutters 51a, 51b have elements and functions discussed above in reference to FIGS. 3A-3B, and therefore is not discussed in detail again.

Accordingly, the universal-blindmate sleeve and techniques described herein provide a flexibility that mitigates the need for pre-provisioning the number of electrical traces, and electrical-optical connections within the midplane implementation. Furthermore, connectivity amongst the modules within a system enclosure can be all-electrical, all-optical, or hybrid, which allows for greater flexibility and optimization for the particular implementation. The "universal" design of the universal-blindmate sleeve allows for multiple functions to be accomplished via the same sleeve, such as allowing air flow, and blindmating of optical and electrical connectors. Moreover, the universal-blindmate sleeves can coexists with conventional midplane blindmate connectors (e.g., power management and electrical connectors).

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A universal-blindmate sleeve, comprising:
   mounting mechanisms for mounting the universal-blindmate sleeve to a midplane, wherein the midplane comprises electrical connectors; and
   a sleeve housing, wherein the sleeve housing comprises:
      a first opening for receiving a first blindmate connector, wherein the first opening is arranged at a first end of the sleeve housing and facing a first side of the midplane;
      a second opening for receiving a second blindmate connector, wherein the second opening is arranged at an opposing end of the sleeve housing and facing an opposing side of the midplane; and
      a body of the sleeve housing configured for blindmating the first blindmate connector to the second blindmate connector therein, wherein the body of the sleeve housing forms an enclosed space separating the first opening and the second opening for blindmating the first blindmate connector to the second blindmate connector through the midplane;
   wherein the universal-blindmate sleeve is configured to accept a plurality of different blindmate connectors.

2. The universal-blindmate sleeve of claim 1, wherein the body of the sleeve housing is configured for blindmating at least one of: optical blindmate connectors, electrical signal blindmate connectors, electrical power blindmate connectors, and cooling conduit blindmate connectors.

3. The universal-blindmate sleeve of claim 2, wherein the electrical blindmate connectors are board-mounted or cable-terminated and having a mechanical tolerance.

4. The universal-blindmate sleeve of claim 1, wherein the first blindmate connector and the second blindmate connector are ganged cooling conduit blindmate connectors.

5. The universal-blindmate sleeve of claim 1, wherein the first blindmate connector is coupled to a compute module, the second blindmate connector is coupled to a fabric aggregation module, and blindmating the first blindmate connector to the second blindmate connector couples the compute module to the fabric aggregation module through the midplane.

6. The universal-blindmate sleeve of claim 1, wherein the first blindmate connector is coupled to a power module, the second blindmate connector is coupled to a fabric aggregation module, and blindmating the first blindmate connector to the second blindmate connector couples the power delivery module to the fabric aggregation module through the midplane.

7. The universal-blindmate sleeve of claim 1, wherein the first blindmate connector is coupled to a cooling module, the second blindmate connector is coupled to a fabric aggregation module, and blindmating the first blindmate connector to the second blindmate connector couples the cooling delivery module to the fabric aggregation module through the midplane.

8. The universal-blindmate sleeve of claim 1, further comprising:
a first shutter mounted to the sleeve housing and proximate to the first opening, wherein the first shutter is configured for pivoting from a closed position to an open position exposing the first opening for receiving the first blindmate connector; and
a second shutter mounted to the sleeve housing and proximate to the second opening, wherein the second shutter is configured for pivoting from a closed position to an open position exposing the second opening for receiving the second blindmate connector.

9. A universal-blindmate sleeve array apparatus, comprising:
mounting mechanisms for mounting the universal sleeve apparatus to a midplane, wherein the midplane comprises electrical connectors;
a body for blindmating a plurality of blindmate connectors to a plurality of complimentary blindmate connectors through the midplane, wherein the body forms a configurable array from a plurality of individual sleeve housings;
one or more dividing mechanisms for delineating between each individual sleeve housing of the plurality of sleeve housings within the array, and wherein each individual sleeve housing comprises:
a first opening for receiving a first blindmate connector from the plurality of blindmate connectors, wherein the first opening is arranged at a first end of the individual sleeve housing and facing a first side of a midplane;
a second opening for receiving a second blindmate connector from the plurality of complimentary blindmate connectors, wherein the second opening is arranged at an opposing end of the individual sleeve housing and facing an opposing side of the midplane; and
an individual sleeve housing body configured for blindmating the first blindmate connector to the second blindmate connector therein, wherein the individual sleeve housing body forms an enclosed space separating the first opening and the second opening for blindmating the first blindmate connector to the second blindmate connector through the midplane;
wherein the individual sleeve housing body is configured to accept a plurality of different blindmate connectors.

10. The universal-blindmate sleeve array apparatus of claim 9, wherein the one or more dividing mechanisms comprise divider walls.

11. The universal-blindmate sleeve array apparatus of claim 10, further comprising:
a first shutter mounted to the individual sleeve housing body and proximate to the first opening, wherein the first shutter is configured for pivoting from a closed position to an open position exposing the first opening for receiving the first blindmate connector; and
a second shutter mounted to the individual sleeve housing body and proximate to the second opening, wherein the second shutter is configured for pivoting from a closed position to an open position exposing the second opening for receiving the second blindmate connector.

12. The universal-blindmate sleeve array apparatus of claim 9, wherein the one or more dividing mechanisms comprise divider rails.

13. The universal-blindmate sleeve array apparatus of claim 9, wherein the configurable array comprises a first number of a plurality of individual sleeve housings arranged in a row orientation, and a second number of a plurality of sleeve housings arranged in a column.

14. The universal-blindmate sleeve array apparatus of claim 9, wherein the individual sleeve housing body is configured for blindmating at least one of: optical blindmate connectors, electrical signal blindmate connectors, electrical power blindmate connectors, and cooling conduit blindmate connectors.

15. The universal-blindmate sleeve array apparatus of claim 9, wherein the body is configured to receive two or more ganged blindmate connectors.

* * * * *